(12) United States Patent
Jasperson, Jr. et al.

(10) Patent No.: US 10,721,183 B2
(45) Date of Patent: *Jul. 21, 2020

(54) ALLOCATING AND ACCESSING HOSTING SERVER RESOURCES VIA CONTINUOUS RESOURCE AVAILABILITY UPDATES

(71) Applicant: Go Daddy Operating Company, LLC, Scottsdale, AZ (US)

(72) Inventors: Harry Jasperson, Jr., Highlands Ranch, CO (US); Daymion Tad Reynolds, Phoenix, AZ (US); William R. Watt, II, San Jose, CA (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/374,518

(22) Filed: Apr. 3, 2019

(65) Prior Publication Data
US 2019/0230048 A1  Jul. 25, 2019

Related U.S. Application Data

(63) Continuation of application No. 15/492,831, filed on Apr. 20, 2017, now Pat. No. 10,291,546, which is a continuation of application No. 14/463,243, filed on Aug. 19, 2014, now Pat. No. 9,660,933, which is a continuation-in-part of application No. 14/255,863, filed on Apr. 17, 2014, now abandoned.

(51) Int. Cl.
*H04L 12/927* (2013.01)
*H04L 12/917* (2013.01)
*H04L 29/08* (2006.01)

(52) U.S. Cl.
CPC ............ *H04L 47/808* (2013.01); *H04L 47/76* (2013.01); *H04L 67/10* (2013.01); *H04L 67/148* (2013.01); *H04L 67/16* (2013.01); *H04L 67/306* (2013.01)

(58) Field of Classification Search
CPC . H04L 47/781; H04L 41/0668; H04L 41/082; H04L 41/0823; H04L 41/22;
(Continued)

(56) References Cited

U.S. PATENT DOCUMENTS 8,484,355 B1 * 7/2013 Lochhead ........... H04L 41/0806
709/226
8,738,333 B1 * 5/2014 Behera .................. G06F 9/5061
703/2
(Continued)

*Primary Examiner* — Greg C Bengzon
(74) *Attorney, Agent, or Firm* — Greenberg Traurig, LLP

(57) ABSTRACT

Systems and methods are provided for dynamically allocating and accessing hosting server resources to users of hosting services. The system may include one or more servers that provide multiple levels of access to the hosting server resources, and an administration server configured with one or more migration paths that allow the user to migrate the account between two levels while the account remains accessible to all entities authorized to access the account. The hosting server resources may be divided according to virtual partitions that are resizable by the administration server. The system may include a migration interface stored on and accessible to the user from the administration server. The migration interface provides the user with options to migrate the account between the levels of access. The system may include an application programming interface that provides access to the administration server for changing the account's level of access.

9 Claims, 20 Drawing Sheets

(58) Field of Classification Search
CPC .......... H04L 41/5006; H04L 41/5009; H04L 41/5019; H04L 41/5025; H04L 41/5048; H04L 41/5054; H04L 43/0882; H04L 45/74; H04L 47/726; H04L 47/76; H04L 47/808; H04L 67/10; H04L 67/1095; H04L 67/16; H04L 67/30; H04L 67/42; H04L 47/782; H04L 47/88; H04L 47/805; H04L 67/28; H04L 67/2809; H04L 67/2814; H04L 67/2842; H04L 67/2885; H04L 67/1004; H04L 67/1002; H04L 67/1008; H04L 67/1012; H04L 67/1029; H04L 67/1031; H04L 69/40; H04L 29/12066; H04L 29/12301; H04L 41/0816; H04L 43/0876; H04L 45/02; H04L 61/1511; H04L 67/306; H04L 61/2076; H04L 41/06; H04L 43/022; H04L 45/028; G06F 3/0629; G06F 3/0646; G06F 3/0647; G06F 3/0655; G06F 3/0635; G06F 9/5061; G06F 9/5077; G06F 9/5083; G06F 9/5088; G06F 17/3089; G06F 17/30899; G06F 17/30902; G06F 15/177; G06F 15/173
See application file for complete search history.

(56) References Cited

U.S. PATENT DOCUMENTS

| | | | | |
|---|---|---|---|---|
| 8,856,077 B1* | 10/2014 | Roth | ............ | H04L 67/1095 707/638 |
| 8,954,574 B1* | 2/2015 | Chheda | ............ | G06Q 20/085 709/220 |
| 9,055,067 B1* | 6/2015 | Ward, Jr. | ............ | H04L 67/10 |
| 9,075,788 B1* | 7/2015 | Roth | ............ | G06F 11/3006 |
| 9,246,996 B1* | 1/2016 | Brooker | ............ | H04L 67/1008 |
| 9,503,517 B1* | 11/2016 | Brooker | ............ | H04L 41/0816 |
| 9,678,803 B2* | 6/2017 | Suit | ............ | H04L 41/0853 |
| 9,804,993 B1* | 10/2017 | Brooker | ............ | G06F 11/3051 |
| 10,530,935 B1* | 1/2020 | Britt | ............ | H04L 61/1582 |
| 2002/0052941 A1* | 5/2002 | Patterson | ............ | G06F 9/5061 709/223 |
| 2007/0078988 A1* | 4/2007 | Miloushev | ............ | G06F 9/485 709/227 |
| 2009/0276771 A1* | 11/2009 | Nickolov | ............ | G06F 9/4856 717/177 |
| 2010/0146086 A1* | 6/2010 | Schwimer | ............ | H04L 45/028 709/221 |
| 2010/0146121 A1* | 6/2010 | Schwimer | ............ | G06F 15/173 709/226 |
| 2010/0146147 A1* | 6/2010 | Schwimer | ............ | H04L 29/12301 709/238 |
| 2010/0146148 A1* | 6/2010 | Schwimer | ............ | H04L 67/1002 709/238 |
| 2011/0161851 A1* | 6/2011 | Barber | ............ | G06F 9/4856 715/769 |
| 2012/0096134 A1* | 4/2012 | Suit | ............ | G06F 9/5072 709/221 |
| 2014/0157363 A1* | 6/2014 | Banerjee | ............ | G06F 9/45558 726/2 |
| 2016/0266801 A1* | 9/2016 | Marcelin Jemenez | ............ | G06F 3/0604 |
| 2017/0199770 A1* | 7/2017 | Peteva | ............ | G06F 9/5088 |
| 2017/0201545 A1* | 7/2017 | Nicodemus | ............ | G06F 11/3495 |

* cited by examiner

ALLOCATING AND ACCESSING HOSTING SERVER RESOURCES VIA CONTINUOUS RESOURCE AVAILABILITY UPDATES

CROSS-REFERENCE TO RELATED APPLICATIONS

This is a continuation and claims benefit of U.S. patent application Ser. No. 15/492,831 filed Apr. 20, 2017, which is a continuation of and claims the benefit of U.S. patent application Ser. No. 14/463,243 filed Aug. 19, 2014, which is a continuation-in-part and claims the benefit of U.S. patent application Ser. No. 14/255,863 filed Apr. 17, 2014, and are incorporated herein by reference.

FIELD OF THE INVENTION

The present invention generally relates to the field of allocating and accessing website resources via dynamic or user-selected resource requirements and domain name routing rules.

BACKGROUND

A computer network is a collection of links and nodes (e.g., multiple computers and/or other devices connected together) arranged so that information may be passed from one part of the computer network to another over multiple links and through various nodes. Examples of computer networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between clients and website resources stored on hosting servers. Hundreds of millions of people around the world have access to computers connected to the Internet via Internet Service Providers (ISPs). Content providers place website resources, such as, as non-limiting examples, multimedia information (e.g., text, graphics, audio, video, animation, and other forms of data) at specific locations on the Internet which may be operated from hosting servers. The combination of all the websites, website resources and their corresponding web pages on the Internet are generally known as the World Wide Web (WWW) or simply the Web.

For clients and businesses alike, the Internet continues to be increasingly valuable. More people use the Web for everyday tasks, from social networking, shopping, banking, and paying bills to consuming media and entertainment. E-commerce is growing, with businesses delivering more services and content across the Internet, communicating and collaborating online, and inventing new ways to connect with each other. Clients may use, as non-limiting examples, a cell phone, PDA, tablet, laptop computer, or desktop computer to access websites or servers, such as hosting servers, via a computer network, such as the Internet.

Prevalent on the Web are multimedia websites, some of which may offer and sell goods and services to individuals and organizations. Websites may consist of a single webpage, but typically consist of multiple interconnected and related webpages. Websites, unless very large and complex or have unusual traffic demands, typically reside on a single hosting server and are prepared and maintained by a single individual or entity (although websites residing on multiple hosting servers are certainly possible). Menus, links, tabs, etc. may be used by clients 100 to move between different web pages within the website or to move to a different website, possibly on the same or a different hosting server.

Websites may be created using HyperText Markup Language (HTML) to generate a standard set of tags that define how the webpages for the website are to be displayed. Clients 100 on the Internet may access content providers' websites using software known as an Internet browser, such as MICROSOFT INTERNET EXPLORER, GOOGLE CHROME or MOZILLA FIREFOX. After the browser has located the desired webpage, the browser requests and receives information from the webpage, typically in the form of an HTML document, and then displays the webpage content for the client. The client then may view other webpages at the same website or move to an entirely different website using the browser.

Some website operators, typically those that are larger and more sophisticated, may provide their own hardware, software, and connections to the Internet. But many website operators either do not have the resources available or do not want to create and maintain the infrastructure necessary to host their own websites. To assist such individuals (or entities), hosting companies exist that offer website hosting services. These hosting providers typically provide the hardware, software, and electronic communication means necessary to connect multiple websites to the Internet. A single hosting provider may literally host thousands of websites on one or more hosting servers.

The server or hosting server comprise hardware servers and may be, as non-limiting examples, one or more Dell PowerEdge(s) rack server(s), HP Blade Servers, IBM Rack or Tower servers, although other types of servers and combinations of one or more servers may be used. Various software packages and applications may run on the servers as desired. These software packages may include virtual machine emulators. A virtual machine is a simulation of a partial or complete computer architecture, implemented using software on, for example, the server or hosting server. The virtual machine can simulate the native architecture of the hosting server on which it is running, or the architecture of another type of server. Multiple virtual machines can be concurrently operated on a server, and so virtual machines are often used to virtually partition the physical resources of the server.

The hosting server can host websites in several different frameworks that affect the availability of the hosting server's resources to each website. In what is commonly known as "shared hosting," the websites on a particular hosting server share access to physical resources such as CPU time, memory, storage space, and bandwidth. In Virtual Private Server (VPS) hosting, the hosting server uses virtual machines to create a VPS for each website/account. Each VPS is allotted particular resources and does not have to share those resources with other VPSs, but some resources such as bandwidth and CPU time are still shared between VPSs. Dedicated hosting commits the entire hosting server and its resources to one particular website/account. A hosting server can have combined shared and VPS hosting, and multiple hosting servers can work together in a server cluster to provide resources to shared, VPS, and dedicated hosting schemes according to the needs of the websites and accounts being hosted. One such distributed framework is known as "cloud hosting," in which several clustered servers pool their physical resources in a virtual environment and provide scalable amounts of those resources to websites hosted in the virtual environment.

Browsers are able to locate specific websites because each website, resource, and computer on the Internet has a unique Internet Protocol (IP) address. Presently, there are two standards for IP addresses. The older IP address standard, often called IP Version 4 (IPv4), is a 32-bit binary number, which is typically shown in dotted decimal notation, where four 8-bit bytes are separated by a dot from each other (e.g., 64.202.167.32). The notation is used to improve human readability. The newer IP address standard, often called IP Version 6 (IPv6) or Next Generation Internet Protocol (IPng), is a 128-bit binary number. The standard human readable notation for IPv6 addresses presents the address as eight 16-bit hexadecimal words, each separated by a colon (e.g., 2EDC:BA98:0332:0000:CF8A:000C:2154:7313).

IP addresses, however, even in human readable notation, are difficult for people to remember and use. A Uniform Resource Locator (URL) is much easier to remember and may be used to point to any computer, directory, or file on the Internet. A browser is able to access a website on the Internet through the use of a URL. The URL may include a Hypertext Transfer Protocol (HTTP) request combined with the website's Internet address, also known as the website's domain name. An example of a URL with a HTTP request and domain name is: http://www.companyname.com. In this example, the "http" identifies the URL as a HTTP request and the "companyname.com" is the domain name.

Domain names are much easier to remember and use than their corresponding IP addresses. The Internet Corporation for Assigned Names and Numbers (ICANN) approves some Generic Top-Level Domains (gTLD) and delegates the responsibility to a particular organization (a "registry") for maintaining an authoritative source for the registered domain names within a Top-Level Domain (TLD) and their corresponding IP addresses. For certain TLDs (e.g., .biz, .info, .name and .org) the Registry is also the authoritative source for contact information related to the domain name and is referred to as a "thick" Registry. For other TLDs (e.g., .com and .net) only the domain name, registrar identification, and name server information is stored within the Registry, and a Registrar is the authoritative source for the contact information related to the domain name. Such Registries are referred to as "thin" registries. Most gTLDs are organized through a central domain name Shared Registration System (SRS) based on their TLD. TLDs may also be referred to as domain name extensions.

The process for registering a domain name with .com, .net, .org, and some other TLD allows a website operator to use an ICANN-accredited Registrar to register their domain name. For example, if a website operator, John Doe, wishes to register the domain name "mycompany.com," John Doe may initially determine whether the desired domain name is available by contacting a domain name registrar. The website operator may make this contact using the Registrar's webpage and typing the desired domain name into a field on the registrar's webpage created for this purpose. Upon receiving the request from the website operator, the Registrar may ascertain whether "mycompany.com" has already been registered by checking the SRS database associated with the TLD of the domain name and/or by checking with the Registry. The results of the search then may be displayed on the webpage to thereby notify the website operator of the availability of the domain name. If the domain name is available, the website operator may proceed with the registration process. If the domain name is not available for registration, the website operator may keep selecting alternative domain names until an available domain name is found.

SUMMARY OF THE INVENTION

The present invention provides systems and methods for a reverse proxy server to identify a domain name and optionally a path within an incoming request (such as an HTTP request). The reverse proxy server may fulfill the request on one or more hosting servers by, as non-limiting examples, configuring, load balancing and/or routing the request according to domain name routing rules for the domain name and optionally the path. The present invention also provides systems and methods for automatically providing dynamic access to server resources for a website located on one or more hosting servers. The systems and methods include user interfaces providing a user responsible for the website to increase or decrease the level of resource availability as needed or desired.

In one embodiment, the present disclosure provides a method for allocating and controlling resources, such as of a hosting server. The method includes providing, by a hosting provider, a plurality of levels of partitioned resource access, each level comprising one or more partitions, on one or more hosting servers, of a predetermined amount of hosting server resources, the predetermined amount of hosting server resources increasing from a lowest of the levels to a highest of the levels. The method further includes providing, by the hosting provider to a user having one or more accounts in one or more of the partitions on a current level of the levels of partitioned resource access, one or more migration paths from the current level to each of the levels higher than the current level and to each of the levels lower than the current level, each of the migration paths facilitating migration of one or more of the accounts from the current level to another of the levels. Each of the migration paths may further facilitate migration of one or more of the accounts from the current level to another of the levels while the accounts each remain accessible to all entities authorized to access the accounts.

In the provided method, the hosting resources may include storage space, physical memory, network bandwidth, and a number of accessible CPUs. One or more of the migration paths may facilitate instant migration between two of the levels. The partitions of one or more of the levels may be virtual partitions. The migration path between each of the levels composed of virtual partitions may include increasing, if the migration path is from a lower of the levels to a higher of the levels, or decreasing, if the migration path is from a higher of the levels to a lower of the levels, the amount of hosting server resources available to the virtual partition within which the account being migrated resides. One or more of the levels may have a single partition having all of the hosting server resources, and the migration path from one of the levels composed of virtual partitions to one of the levels composed of a single partition may include copying the account being migrated from a first of the hosting servers on which the account resides to a second of the hosting servers that has the single partition.

The provided method may further include providing, by the hosting provider to the user, a unified control panel accessible at any level of partitioned resource access on which the user has one or more of the accounts. The provided method may further include providing, by the hosting provider, a plurality of shared resource platforms each comprising one or more of the levels of partitioned resource access. The shared resource platforms may include a shared platform and a virtual private server (VPS) platform. The levels of partitioned resource access within the shared hosting platform may include a higher density level having partitions for a first number of hosted users, and a lower density level having partitions for a second number of hosted users, the second number being lower than the first number, and the partitions of the lower density level having more hosting server resources than the partitions of the higher density level. The method may further include providing, by the hosting provider, one or more dedicated platforms, each dedicated platform having access to all of the hosting server resources of one or more of the hosting servers. The method may further include providing, by the hosting provider to the user, a unified control panel usable to control the user's accounts on any of the shared resource platforms or on any of the dedicated platforms.

In another embodiment, the present disclosure provides a method that includes providing, by a hosting provider to a user: an account on one or more hosting servers; a plurality of levels of resource access, each level including access to a predetermined amount of server resources of one or more of the hosting servers, the predetermined amount of hosting server resources increasing from a lowest of the levels to a highest of the levels, the account residing on a current level of the levels of resource access; and providing, by the hosting provider to the user, one or more migration paths from the current level to each of the levels higher than the current level and to each of the levels lower than the current level, each of the migration paths facilitating movement of one or more of the accounts from the current level to another of the levels. The method may further include migrating, by the hosting provider, the account from the current level to a level above the current level without interrupting access to the account by any authorized entity. Migrating the account may include increasing the predetermined amount of server resources accessible by the account. Migrating the account may also include retaining the account on the hosting server on which the account resided at the current level. Migrating the account may also include copying the account from the hosting server on which the account resides at the current level to another of the hosting servers.

In yet another embodiment, the present disclosure provides a system that includes one or more hosting servers communicatively connected to a computer network, each hosting server providing one or more levels of access to the server resources of each hosting server, each level correlating to a predetermined amount of server resources of the hosting server, the predetermined amount increasing from a lowest of the levels to a highest of the levels, one or more of the hosting servers being configured to host an account having a current level of the levels of access. The system further includes one or more migration paths from the current level to one or more of the levels higher than the current level and to one or more of the levels lower than the current level, each of the migration paths facilitating migration of the account from the current level to another of the levels, wherein there is at least one such migration path to and from each level. Each of the migration paths may further facilitate migration of the account from the current level to another of the levels while the account remains accessible to all entities authorized to access the account. The hosting resources may include storage space, physical memory, network bandwidth, accessible CPUs and/or accessible CPU cores.

Each of the hosting servers may be either: a shared hosting server having a plurality of partitions, each partition being allocated the predetermined amount of server resources identified by one of the levels of access other than the highest level of access; or a dedicated hosting server accessible at the highest level of access, wherein the predetermined amount of server resources identified by the highest level of access is all of the server resources. One or more of the shared hosting servers may be a uniform density shared hosting server on which all of the partitions are allocated the same amount of server resources. The partitions of a first of the uniform density shared hosting servers may be allocated the predetermined amount of server resources identified by a lower of the levels of access, and the partitions of a second of the uniform density shared hosting servers may be allocated the predetermined amount of server resources identified by a higher of the levels of access. One of the migration paths from the lower level to the higher level may include copying the account from the first uniform density shared hosting server to the second uniform density shared hosting server. One or more of the shared hosting servers may be a variable density shared hosting server on which each of the partitions is allocated one of the predetermined amounts of server resources identified by one of the levels. One of the migration paths from a lower of the levels to a higher of the levels may include increasing the allocation of server resources to the partition on one of the variable density shared hosting servers in which the account to be migrated resides from a first predetermined amount identified by the lower level to a second predetermined amount identified by the higher level. The variable density shared hosting server on which the account resides may support partitions that are each allocated resources according to one of three different levels of access.

When the account is hosted in one of the partitions of one of the shared hosting servers at the current level, and a next higher of the levels requires the account to be hosted on another of the shared hosting servers or on one of the dedicated hosting servers, one of the migration paths from the current level to the next higher level may include copying the account to one of the partitions of the other shared hosting server or to the dedicated hosting server.

One or more of the hosting servers may include a plurality of virtual containers, each container being allocated the predetermined amount of server resources identified by one of the levels of access. One of the migration paths may include resizing the virtual container containing the account.

The system may further include a routing server in electronic communication with the computer network and with the hosting servers and configured to receive a request for access to the account, determine the hosting server that hosts the account, and access the account according to the request. The routing server may determine the appropriate hosting server by analyzing layer 7 data of the request. The routing server may be a high-availability reverse proxy server. The routing server may include domain name routing rules and determines the appropriate hosting server by identifying a domain name from the request and routing the request using the domain name routing rules.

In yet another embodiment, the present disclosure provides a method for allocating server resources of one or more hosting servers to a user. The method may include providing, by a hosting provider, one or more levels of access to the server resources of each hosting server, each level correlating to a predetermined amount of the server resources, the predetermined amount increasing from a lowest of the levels to a highest of the levels. The method further includes providing, by the hosting provider to the user: an account on one or more of the hosting servers at a current level of the levels of access; and, one or more migration paths from the current level to one or more of the levels higher than the current level and to one or more of the levels lower than the current level, each of the migration paths facilitating migration of the account from the current level to another of the levels, wherein there is at least one such migration path to and from each level. The method may further include migrating, by the hosting provider, the account from the current level along one of the migration paths to a level above the current level without interrupting access to the account by any authorized entity. Migrating the account may include receiving, from a migration interface, an input from the user requesting an increase in the level of access for the account. Migrating the account may include increasing the predetermined amount of server resources accessible by the account. The account may be contained in a resizable virtual container on one of the hosting servers.

In yet another embodiment, the present disclosure provides a system that includes an administration server in electronic communication with a computer network and with one or more hosting servers, each hosting server having server resources for hosting an account of a user. The administration server provides a plurality of levels of access to the server resources of one or more of the hosting servers, and is configured with one or more migration paths that allow the user to migrate the account between two levels, wherein there is at least one such migration path to and from each level. The system further includes a migration interface stored on and accessible to the user from the administration server, the migration interface providing the user with options to migrate the account between the levels of access. The administration server may be one of the hosting servers. The migration interface may be an application programming interface. The migration interface May present the options to migrate the account visually as a resource slider comprising an interactive graphic having a plurality of positions that correspond to the levels of access. The slider indicates to the user a current position on the slider corresponding to a current level, of the levels of access, of the account. The migration interface may include a graphic display relating the positions of the slider to an amount of server resources made available at each position. The migration interface may include a textual display describing the server resources made available at each position. The migration interface may modify the textual display according to the position of the interactive graphic to show one or more parameters of the server resources.

The migration interface may present the options to migrate the account visually as a text menu listing the levels of access to which the account can be migrated. The administration server may be configured to monitor the account's server resource usage, and when the account exceeds a predetermined threshold percentage of server resources used, the migration interface may present the options to migrate the account visually as a warning window comprising a text indicator that the account should be migrated to a higher of the levels. The text indicator may include colored text indicating which of the server resources has usage exceeding the predetermined threshold. The administration server may be configured to compare the account's server resource usage to server resource parameters of each of the levels of access and recommend to the user, via the migration interface, migration to one of the higher levels.

The administration server may be further configured to: receive, from the user via the migration interface, a request to migrate the account to a target level of the levels of access; identify the one or more migration paths that correspond to migration of the account from a current level of the levels of access to the target level; and, migrate the account from the current level to the target level while maintaining availability of access to the account. The system may further include a control panel for the account, the control panel being stored on and accessible to the user from the administration server, and the control panel providing access to the migration interface. The control panel may remain unchanged when the account is migrated between any two of the levels of access. A first of the levels of access may correspond to a shared hosting platform, a second of the levels may correspond to a virtual private server platform, and a migration of the account from the first level to the second level may add administrative controls to the control panel, the control panel remaining otherwise unchanged.

In yet another embodiment, the present disclosure provides a system that includes an application programming interface (API) stored on and configurable by a computer server electrically connected to a computer network. The API is connected to one or more hosting servers via the computer network, includes a migration interface that configures an account hosted by one or more of the hosting servers to use server resources of the hosting servers in accordance with a current level of a plurality of levels of access, and is configured to select one or more migration paths that migrate the account between two levels, wherein there is at least one such migration path to and from each level. The migration interface may include a display of one or more options to migrate the account. The display may include a resource slider comprising an interactive graphic having a plurality of positions that correspond to the levels of access. The display may include a text menu of the options and text describing the server resources made available at each position.

It should be understood that teachings from any embodiment herein described may be combined with teachings from any other embodiment herein described, unless explicitly stated otherwise. The above features and advantages of the present invention will be better understood from the following detailed description taken in conjunction with the accompanying drawings.

DETAILED DESCRIPTION

Figure 1:
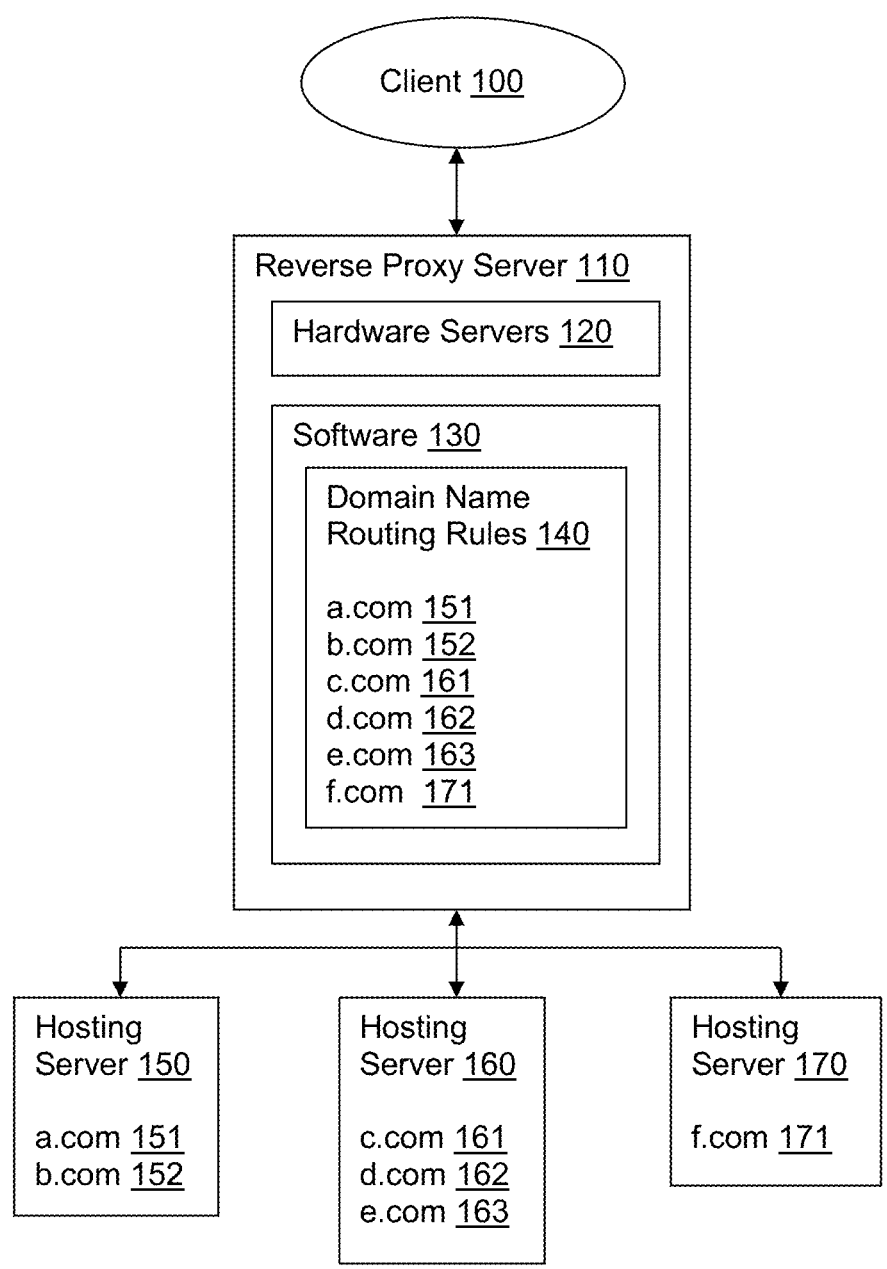
FIG. 1 is a block diagram of a system for allocating and accessing website resources or hosted content via domain name routing rules.

The present invention will now be discussed in detail with regard to the attached drawing figures that were briefly described above. In the following description, numerous specific details are set forth enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

FIG. 1 is a block diagram of a system that may be used to practice the present invention. The client 100 may communicate with one or more reverse proxy servers 110 (illustrated as a single reverse proxy server 110 for simplicity) and the reverse proxy server 110 may communicate with one or more hosting servers 150, 160, 170 over a computer network.

A reverse proxy server 110 may be a type of server that retrieves resources on behalf of a client 100 from one or more hosting servers 150, 160, 170. These resources may then be returned to the client 100 as though they originated from one or more of the servers 150, 160, 170. A reverse proxy server 110 may act as an intermediary for its hosting servers 150, 160, 170 and only returns resources provided by those hosting servers 150, 160, 170.

Reverse proxy servers 110 may hide the existence and characteristics of the origin hosting server(s) 150, 160, 170. Application firewall features on a reverse proxy server 110 may protect against common web-based attacks. Without a reverse proxy server 110, removing malware or initiating takedowns, for example, may be more difficult. A reverse proxy server 110 may distribute the load from incoming requests to several hosting servers 150, 160, 170, with each hosting server 150, 160, 170 serving its own application area. A reverse proxy server 110 may reduce load on its origin hosting servers 150, 160, 170 by caching static and dynamic content.

The reverse proxy server 110 may comprise, as non-limiting examples, one or more hardware servers 120, such as Dell PowerEdge(s) rack server(s), HP Blade Servers, IBM Rack or Tower servers, although other types of servers and/or combinations of one or more servers may also be used. Software 130 and applications may be run on the reverse proxy server 110.

The software 130 preferably also comprise domain name routing rules 140. The domain name routing rules 140 may receive a domain name and optionally a path (possibly in a header of an HTTP request received by the reverse proxy server 110) as an input and provide an address to the reverse proxy server 110 to facilitate locating a website or website resource on one or more hosting servers 150, 160, 170.

As a non-limiting example, the domain name routing rules 140 may receive a domain name a.com 151, from a request to the reverse proxy server 110, and the domain name routing rules 140 may provide an address to a website or a website resource a.com 151 in a hosting server 150. A similar process may be used by the domain name routing rules 140 for a plurality of domain names, such as a.com 151, b.com 152, c.com 161, d.com 162, e.com 163 and f.com 171 to point to, locate or provide an address to a plurality of corresponding websites or website resources such as a.com 151, b.com 152 in hosting server 150, c.com 161, d.com 162 and e.com 163 in hosting server 160 and f.com 171 in hosting server 170. In practice, any number of domain names (and optionally paths) and hosting servers may be used.

Figure 4:
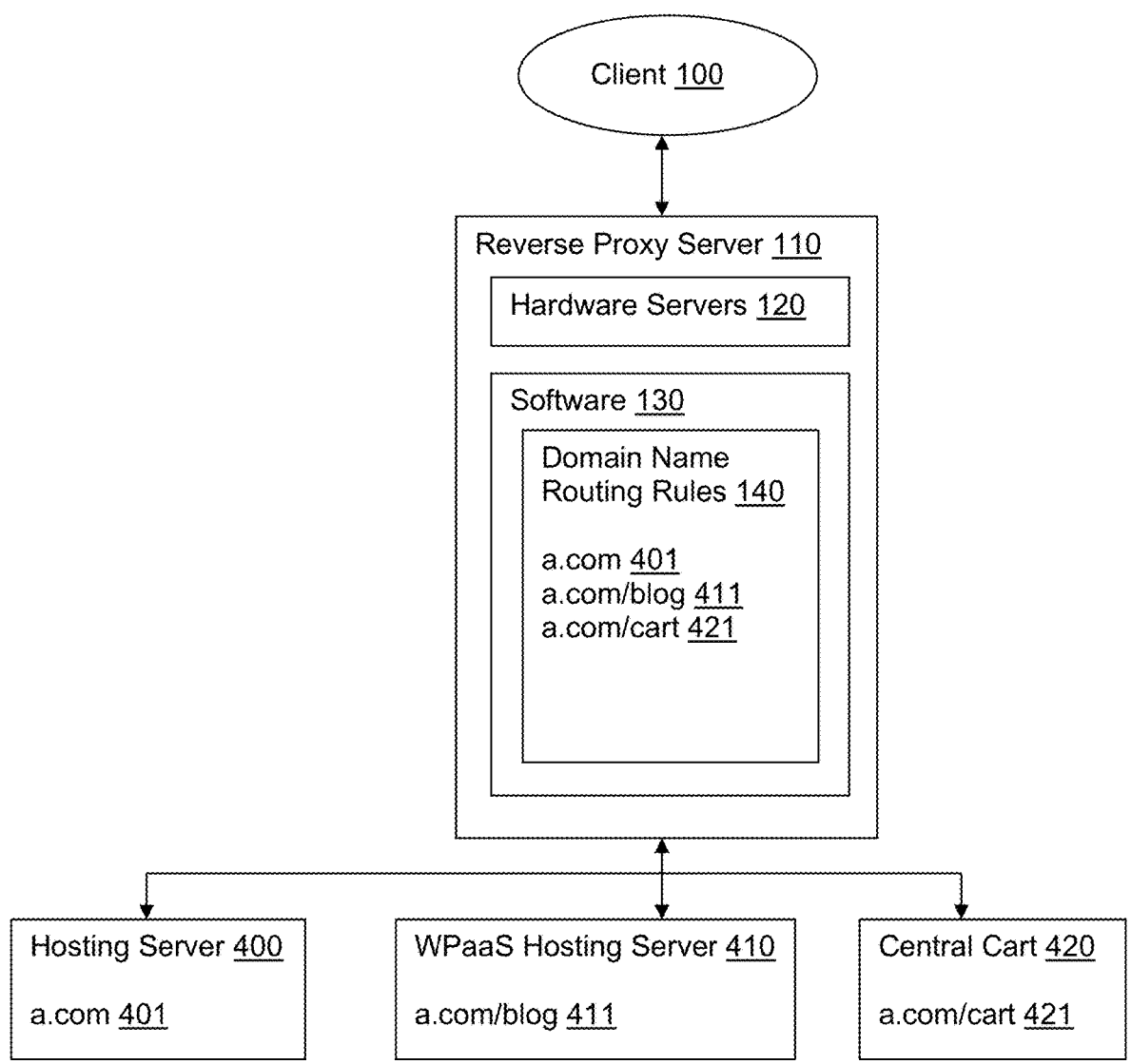
FIG. 4 is a block diagram of a system with product and service integration using domain name routing rules.

FIG. 4 illustrates another embodiment for domain name routing rules 140. As a non-limiting example, the domain name routing rules 140 may receive a domain name and a path, such as a.com/blog 411 or a.com/cart 421 from a request to reverse proxy server 110, and the domain name routing rules 140 may provide an address to a website or website resource, such as a.com/blog 411 in WordPress as a Service (WPaaS) hosting server 410 or a.com/cart 421 in Central Cart hosting server 420.

An example method of practicing the invention will now be described with reference to FIGS. 1-5. A client 100 or customer may register a domain name and purchase hosting services on one or more hosting servers 150, 160, 170. A hosting administrator may set up the one or more hosting servers 150, 160, 170 in preparation for providing hosting services and configure a reverse proxy server 110 for the domain name to route incoming requests to the purchased hosting services on the one or more hosting servers 150, 160, 170. The customer or client 100 may host a website or website resources, such as, as non-limiting examples, SSL, blogs, shopping carts, etc., on the hosting servers 150, 160, 170.

The hosting administrator may be automated or manual. Automated hosting administrators may be hardware or software based, and may be configured to make administrative changes to software services running on any hosting server 150, 160, 170 or reverse proxy server 110. The hosting administrator may generate and store, on the reverse proxy server 110 (possibly for a cluster of servers or hosting servers 150, 160, 170), a set of domain name routing rules 140. The domain name routing rules 140 may be part of any proprietary or open source software for fulfilling a request, wherein the request may be, as non-limiting examples, configuring, routing and/or load balancing a server cluster. The server cluster may comprise the one or more hardware servers 150, 160, 170. The domain name routing rules 140 may identify the individual IP for each hosting server 150, 160, 170 in the server cluster, the website content stored on each hosting server 150, 160, 170 by domain name and where traffic to the website should be directed based on the domain name, the individual IPs and/or a path.

The reverse proxy server 110 may receive an incoming request, such as an HTTP request, related to the website or website resource. The domain name routing rules 140 may instruct the reverse proxy server 110, rather than accessing the Domain Name System (DNS), to analyze the request packet to identify the domain name. The reverse proxy server 110 may identify the domain name within a header of the request (inspects the application layer—OSI layer seven for example). The reverse proxy server 110 may consult the domain name routing rules 140 to determine the server resources, such as hosting servers 150, 160, 170, to be used and the action to take to fulfill the request.

The action to fulfill the request may be moving website files from one server to another, but using a domain name, rather than the DNS, to do it. Because the DNS is not used, the perceived change of files from one resource to another is instantaneous (i.e., no delay because of DNS updates). For example, if a.com 151 and b.com 152 want half a hosting server 150, a.com 151 and b.com 152 could share a hosting server 150 without changing the DNS. This change may be accomplished by changing the domain name routing rules 140 that directs the traffic on the proxy tier (reverse proxy server 110) rather than changing the DNS.

Figure 2:
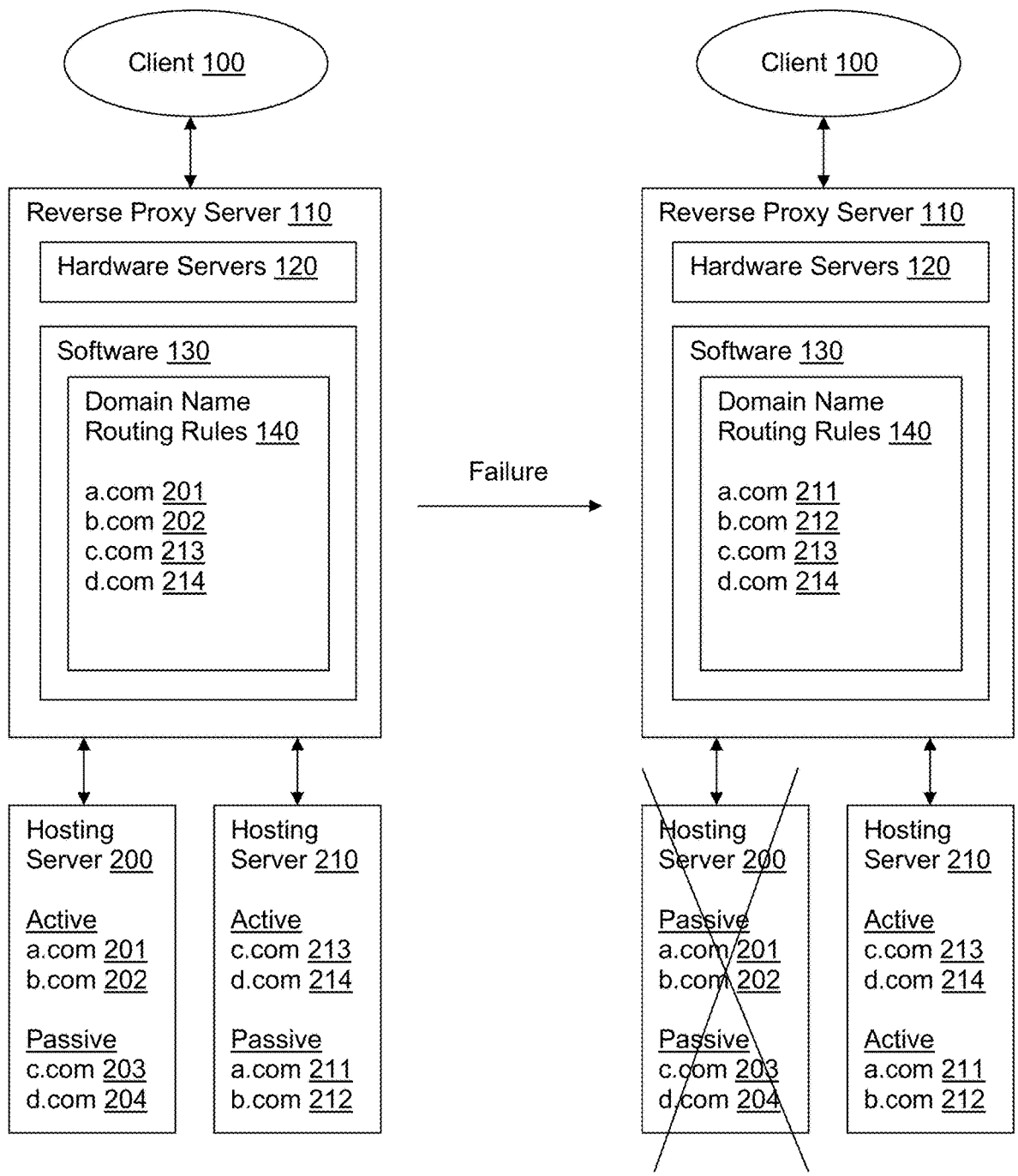
FIG. 2 is a block diagram of a system with redundancy and automatic failover capabilities using domain name routing rules.

The action to fulfill the request may be allocating resources on a passive server to be activated when an active site(s)/hosting server(s) fail (i.e. failover using the domain name as a routable construct). An example is shown in FIG. 2. The domain name routing rules may activate the site on another node or hosting server 150, 160, 170. The domain name routing rules 140, rather than IP addresses, may be used to change the pointer in the reverse proxy server 110 so that it points to the node or hosting server 150, 160, 170 where the website or website resource is to be activated.

Figure 3:
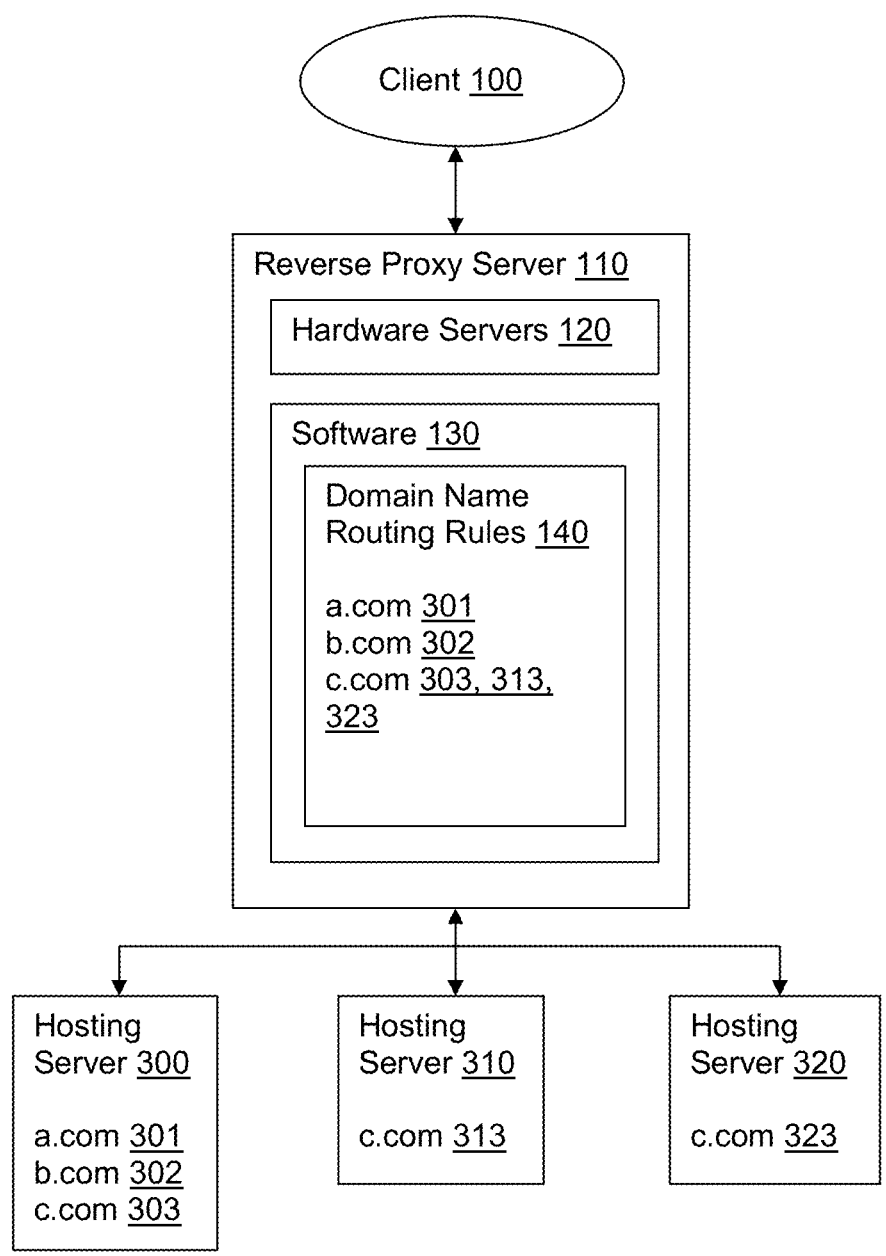
FIG. 3 is a block diagram of a system with account server spanning capabilities using domain name routing rules.

The action to fulfill the request may be to provide a website or website resource that spans two or more hosting servers 150, 160, 170 using any method, such as, as a non-limiting example, Infrastructure as a Service (IaaS). An example is shown in FIG. 3 where a client 100 registering the domain name c.com has purchased hosting services on 2⅓ hosting servers 300, 310, 320. To route the traffic for these hosting servers 300, 310, 320, all three hosting servers 300, 310, 320 may be routed from one domain name, e.g., c.com 303, 313, 323. Each node or hosting server 300, 310, 320 in the cluster may run a private IP, which the reverse proxy server 110 may recognize due to the domain name routing rules 140.

The action to fulfill the request may be to use reusable cache for website content on a cluster server nodes, rather than on the reverse proxy server 110. Rather than caching the reverse proxy server 110, or caching files spanning all servers for a customer or client 100, the website resources, such as files, for the allocation on the server may be cached on the server that has the file allocation. This may be an efficiency measure, as the load is not spread that doesn't need to be spread.

Some embodiments may improve the Search Engine Optimization (SEO) ranking by eliminating subdomains and redirect usage for a website or a website resource. Subdomains are often used to route request to multiple services on the same domain name. SEO tends to give subdomains a reduced value in points compared to root domain names. Using domain names as a routable construct in domain name routing rules 140 allows use of domain name paths to different services on different resources.

FIG. 4 illustrates an example where the domain name routing rules 140 may be written to recognize that a.com/blog is on a completely different hosting server 400, 410, 420 from a.com or a.com/cart and direct traffic to the correct service. This may allow different services on different hosting servers 400, 410, 420 to be combined together under one domain name (a.com in this example) without using subdomains or redirects, but still directing to safe locations to process transactions. This approach may be more efficient than hosting secure/non-secure content/services on the same hosting server 400, 410, 420 or website. SEO values may also be higher because subdomain are not being used. In addition, to the client 100 all the services look like one common service and/or website, but the reverse proxy server 110 uses the domain name and optionally a path to access SSL, cart services or any other website services or resources on one or more hosting servers 400, 410, 420.

Figure 6:
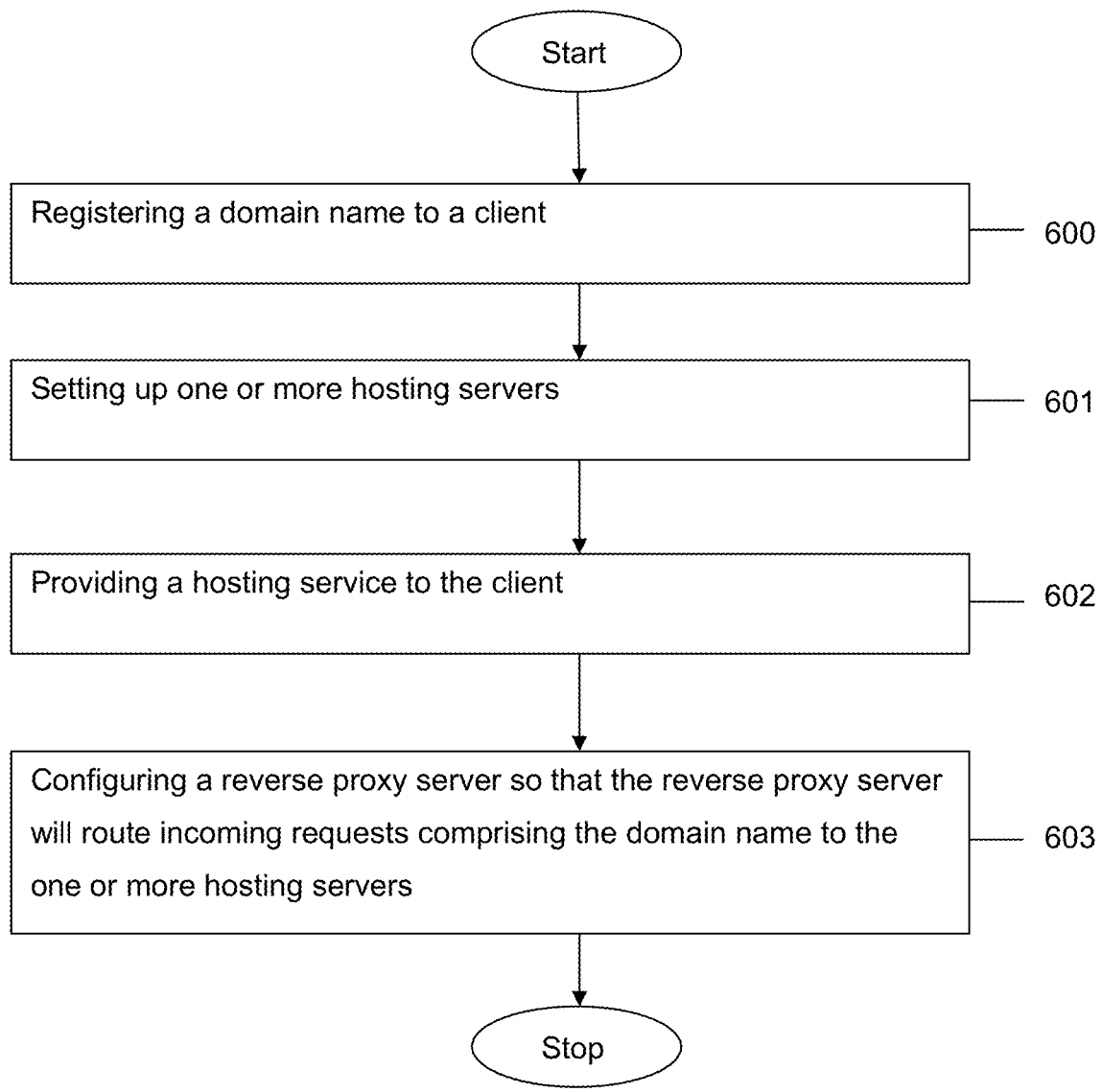
FIG. 6 is a flow diagram of a process for allocating and controlling website resources using domain name routing rules.

FIG. 6 illustrates an example method for practicing the invention. A domain name, for example a.com, may be registered to a client 100. (Step 600) Hosting server(s) 150, 160, 170 may be set up in preparation for providing hosting services. (Step 601) Hosting services (such as hosting a website or website resource a.com 151 on hosting server 150) on one or more hosting servers 150, 160, 170 may also be provided to the client 100. (Step 602) A reverse proxy server 110 may be configured so that the reverse proxy server 110 will route incoming requests comprising a domain name, such as a.com 151, to a website or website resource (a.com 151) located on one or more hosting servers 150. (Step 603)

To facilitate the routing, the reverse proxy server 110 may include domain name routing rules 140 for a plurality of domain names (a.com 151, b.com 152, c.com 161, d.com 162, e.com 163 and f.com 171), wherein the domain name routing rules 140 may receive a domain name and determine an address or location of a website or website resource on one or more hosting servers 150, 160, 170. Specifically, if the domain name routing rules 140 received the domain name a.com 151, the domain name routing rules 140 may point to website or website resource a.com 151 on hosting server 150.

Figure 7:
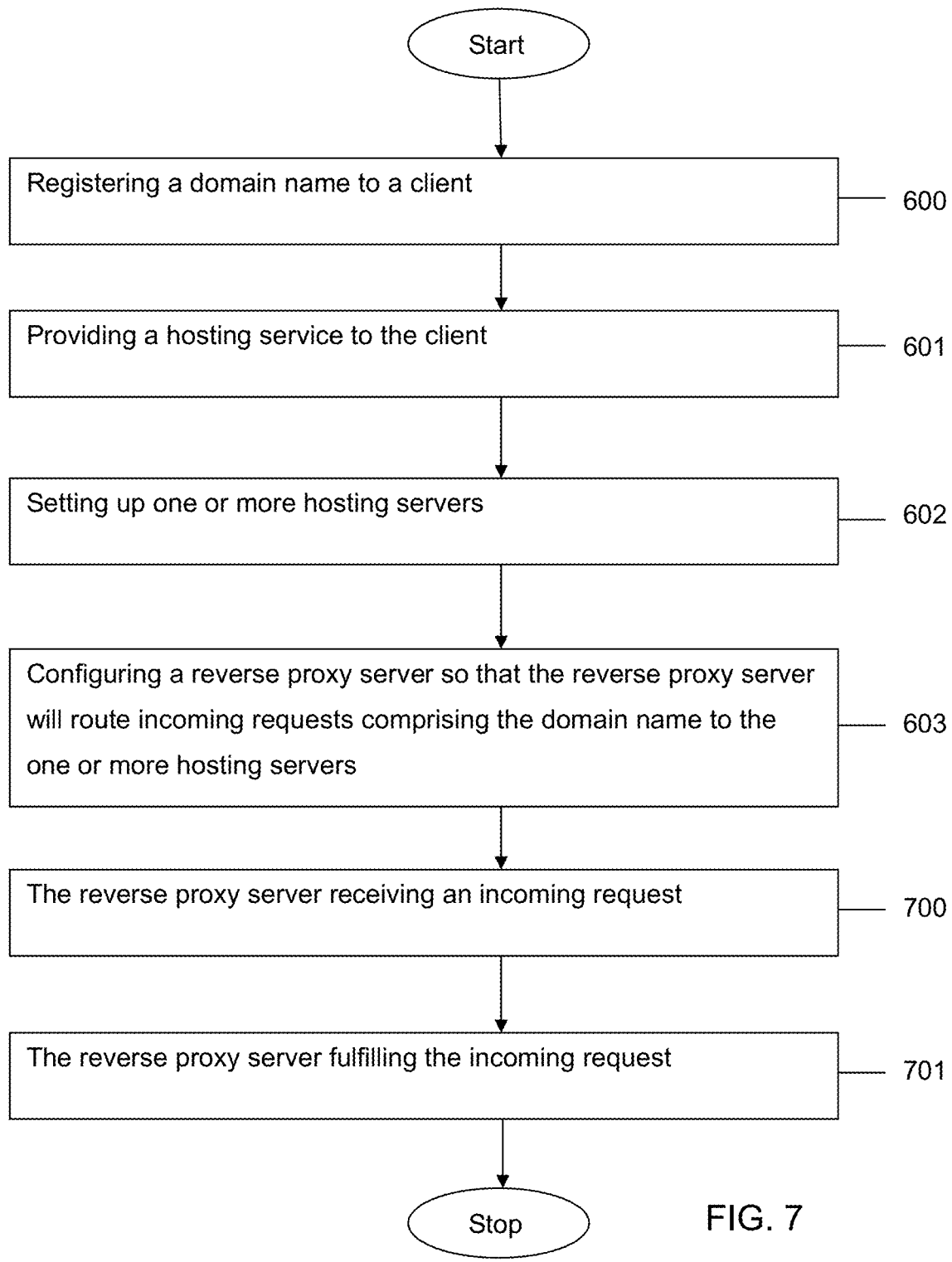
FIG. 7 is a flow diagram of the process illustrated in FIG. 6, with the additional steps of receiving and fulfilling an incoming request.

FIG. 7 illustrates another example method for practicing the invention. This embodiment includes the method illustrated in FIG. 6, but further includes the steps of the reverse proxy server 110 receiving an incoming request (Step 700) and then fulfilling the incoming request (Step 701). In some embodiments, the incoming request may comprise a request to move a website file from a first server 150 in the one or more hosting servers 150, 160, 170 to a second server 160 in the one or more hosting servers 150, 160, 170. As shown in FIG. 2, in some embodiments the incoming request may comprise a request to activate passive resources a.com 211, b.com 212 on a first hosting server 210 in the one or more hosting servers 200, 210 and deactivate active resources a.com 201 and b.com 202 on a second server 200 in the one or more hosting servers 200, 210.

Figure 8:
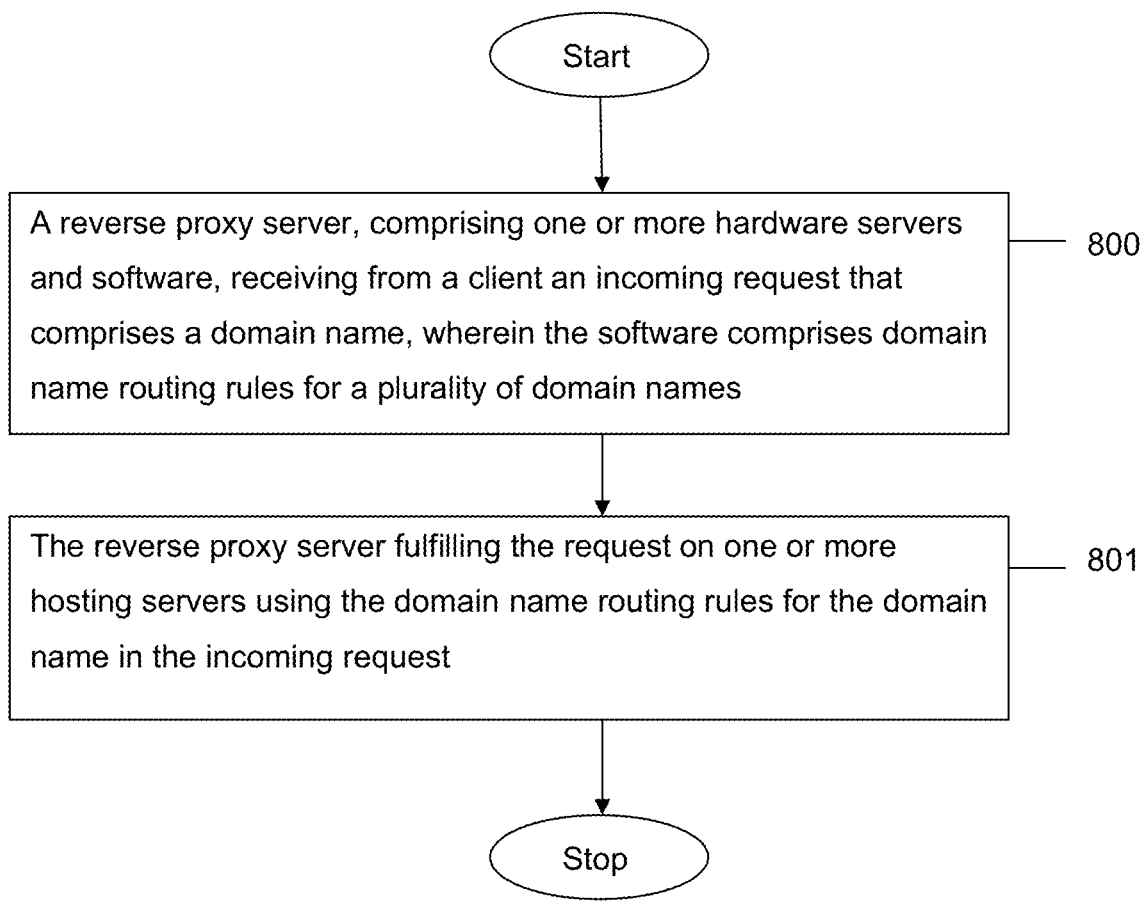
FIG. 8 is a flow diagram of another process for allocating and controlling website resources using domain name routing rules.

FIG. 8 illustrates another example method for practicing the invention. A reverse proxy server 110 may receive from a client 100 an incoming request that has a domain name. The reverse proxy server 110 may comprise software that includes domain name routing rules 140 for a plurality of domain names. (Step 800) The reverse proxy may fulfill the incoming request on one or more hosting servers 150, 160, 170 using the domain name routing rules for the domain name in the incoming request to determine a website or website resource located on the one or more hosting servers 150, 160, 170. (Step 801) The incoming request may be an HTTP request.

In other embodiments, the incoming request has a domain name and a path, such as a.com/blog 411, as illustrated in FIG. 4, so the domain name routing rules 140 may locate the associated website resource a.com/blog 411 in the WPaaS Hosting Server 410. The software 130 may comprise domain name routing rules 140 for a plurality of domain names 401 and one or more domain names, in the plurality of domain names, may each be associated with one or more paths.

Figure 9:
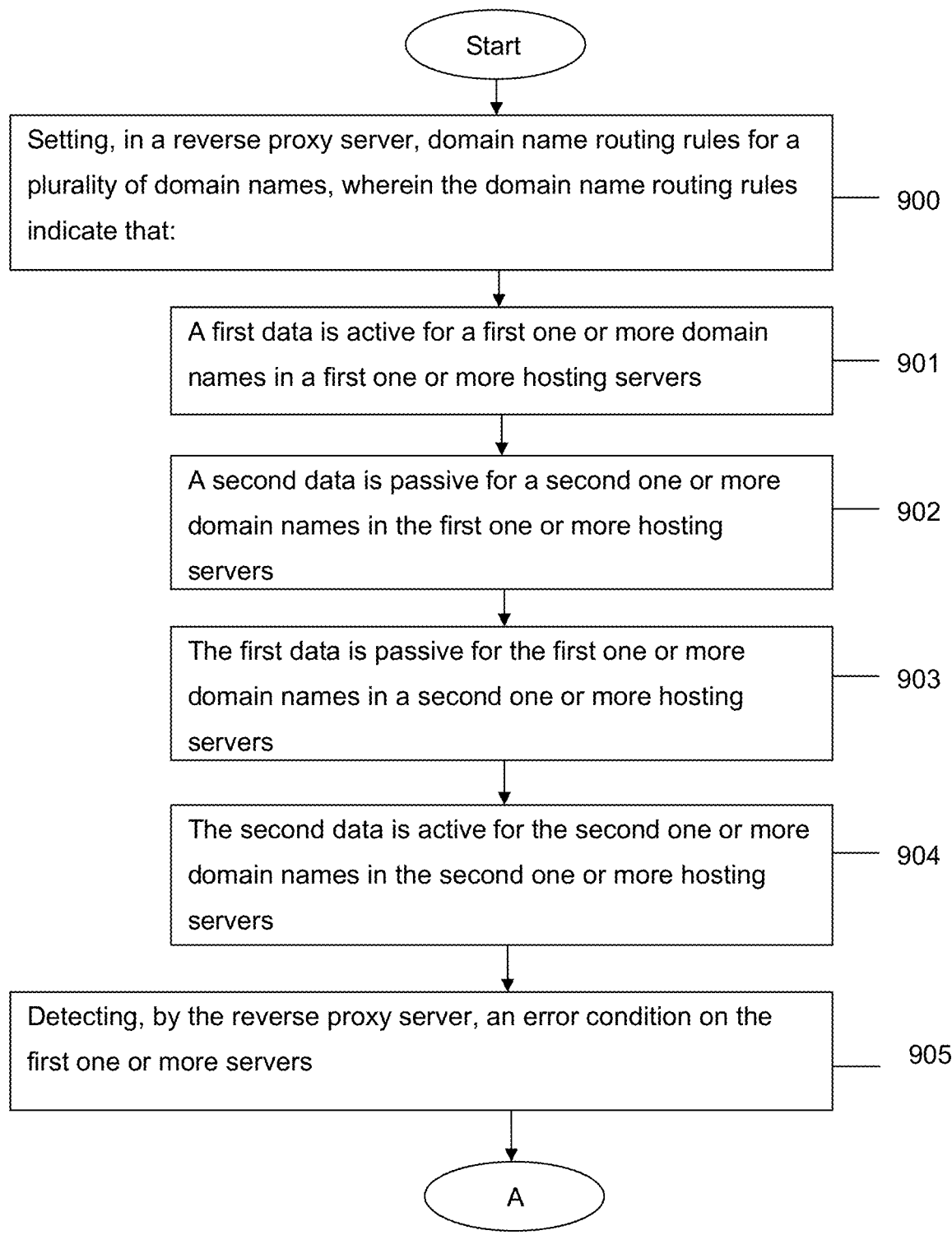
FIG. 9 is a first half of a flow diagram illustrating a method for redundancy and automatic failover for website resources using domain name routing rules.
Figure 10:
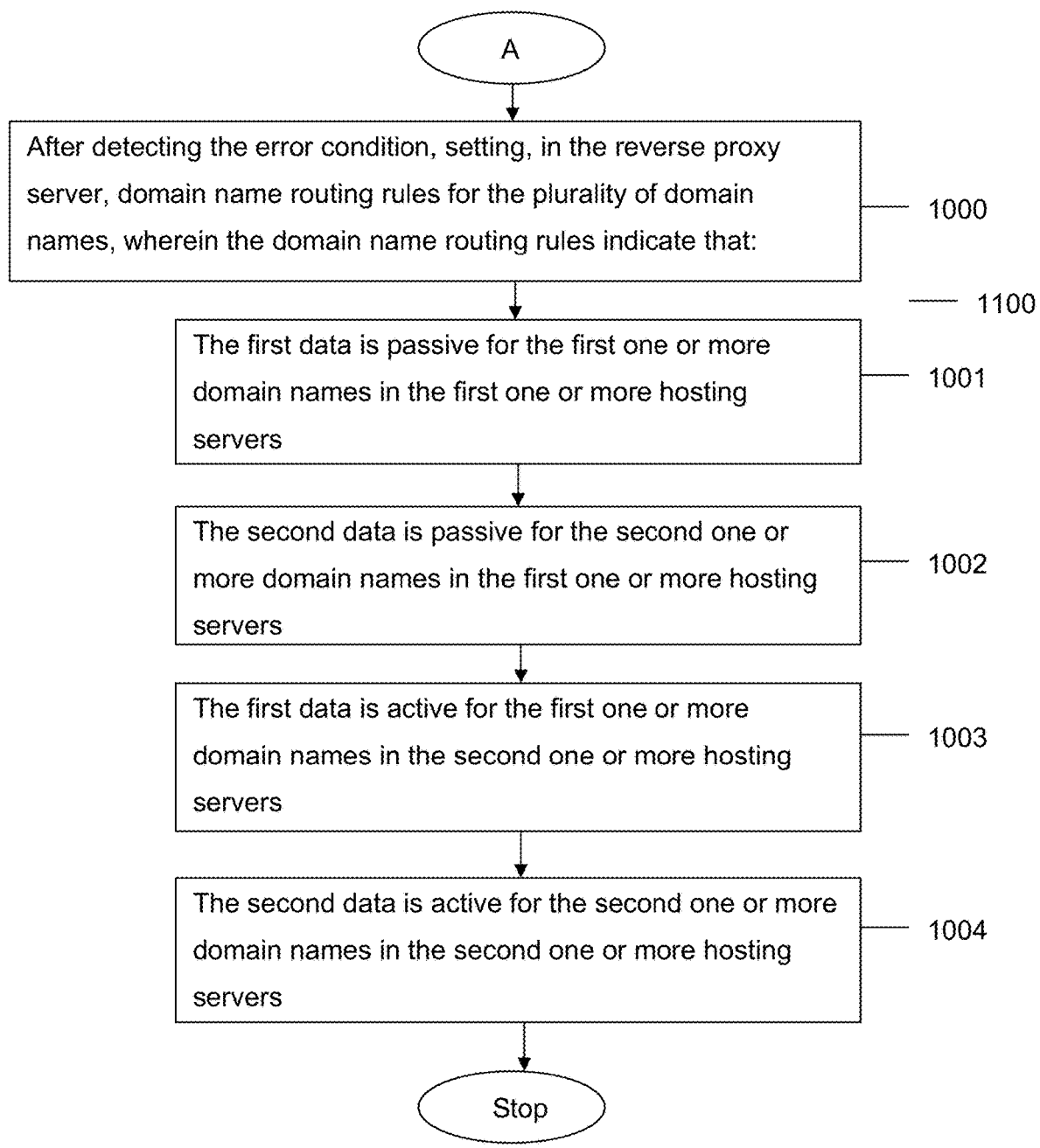
FIG. 10 is a second half of a flow diagram illustrating a method for redundancy and automatic failover for website resources using domain name routing rules.

FIGS. 2, 9 and 10 illustrate another example embodiment for practicing the invention. This embodiment allows for a method that includes redundancy and provides for an automatic failover in the event of an error condition. The reverse proxy server 110 may set domain name routing rules 140 (Step 900) to indicate that: a first data is active for a first one or more domain names (a.com 201 and b.com 202) in a first one or more hosting servers (hosting server 200) (Step 901); a second data is passive for a second one or more domain names (c.com 203, d.com 204) in the first one or more hosting servers (hosting server 200) (Step 902); the first data is passive for the first one or more domain names (a.com 211 and b.com 212) in a second one or more hosting servers (hosting server 210) (Step 903); and the second data is active for the second one or more domain names (c.com 213 and d.com 214) in the second one or more hosting servers (hosting server 210) (Step 904).

The reverse proxy server 110 may detect an error condition on one or more of the hosting servers 200, 210, such as, as an example, the hosting server 200. (Step 905)

After detecting the error condition, the reverse proxy server 110 may reset or rewrite the domain name routing rules 140 for the plurality of domain names (Step 1000), wherein the domain name routing rules 140 indicate that: the first data is passive for the first one or more domain names (a.com 201 and b.com 202) in the first one or more hosting servers (hosting server 200) (Step 1001); the second data is passive for the second one or more domain names (c.com 203 and d.com 204) in the first one or more hosting servers (hosting server 200) (Step 1002); the first data is active for the first one or more domain names (a.com 211 and b.com 212) in the second one or more hosting servers (hosting server 210) (Step 1003); and the second data is active for the second one or more domain names (c.com 213 and d.com 214) in the second one or more hosting servers (hosting server 210) (Step 1004).

Figure 11:
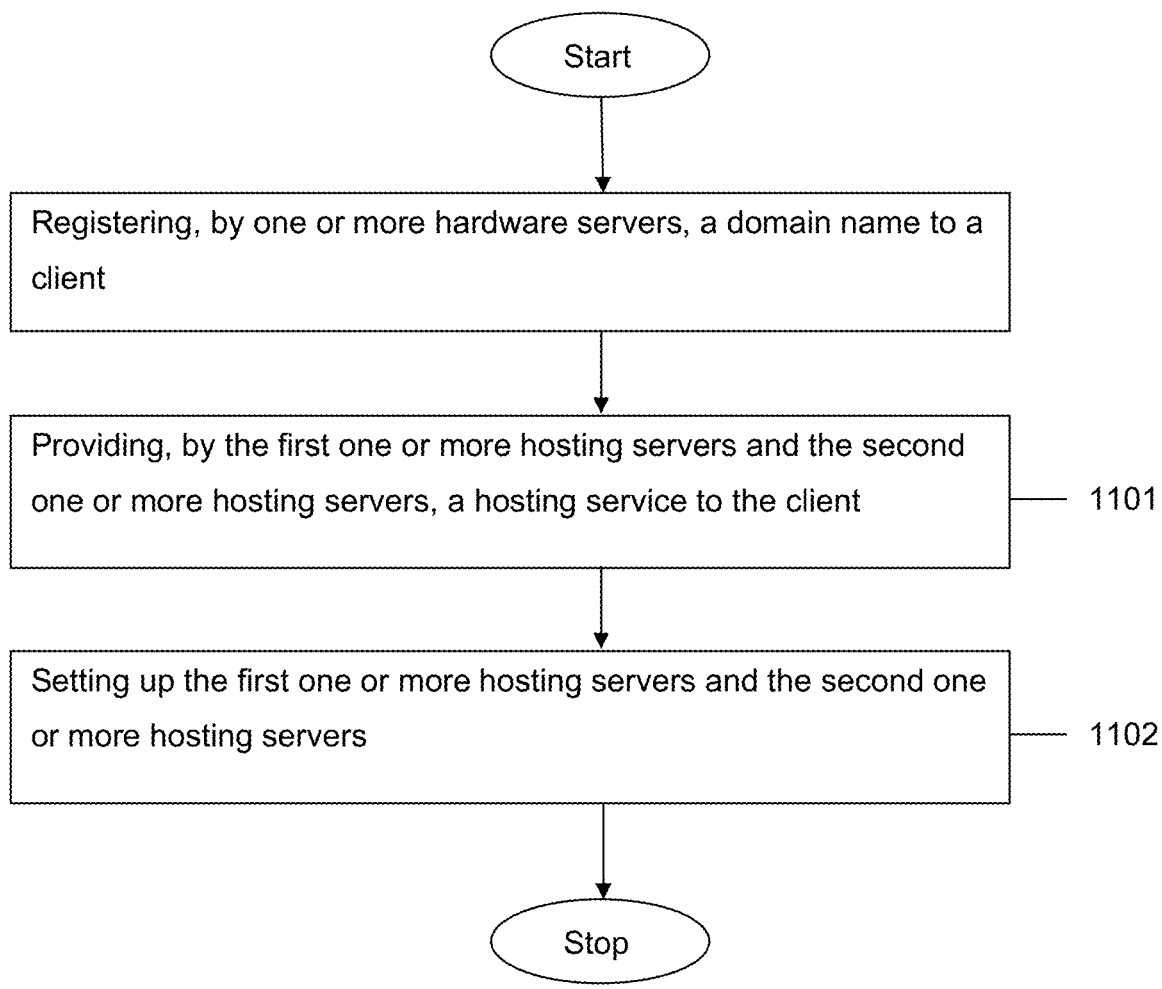
FIG. 11 is a flow diagram of additional steps that may be performed in combination with other embodiments.

FIG. 11 illustrates additional steps that may taken by themselves or combined with other embodiments. One or more hardware servers may register a domain name to a client 100. (Step 1100). A first one or more hosting servers 200 and a second one or more hosting servers 210 may provide hosting services to the client 100. (Step 1101) The first one or more hosting servers 200 and the second one or more hosting servers 210 may be set up in preparation for providing hosting services. (Step 1102) In some embodiments, the reverse proxy server 110 (comprising one or more hardware servers and software) may receive an incoming request that comprises a domain name in a plurality of domain names and fulfills the incoming request on the first one or more hosting servers 200 or on the second one or more hosting servers 210 using the domain name routing rules 140 for the domain name in the incoming request.

Figure 12:
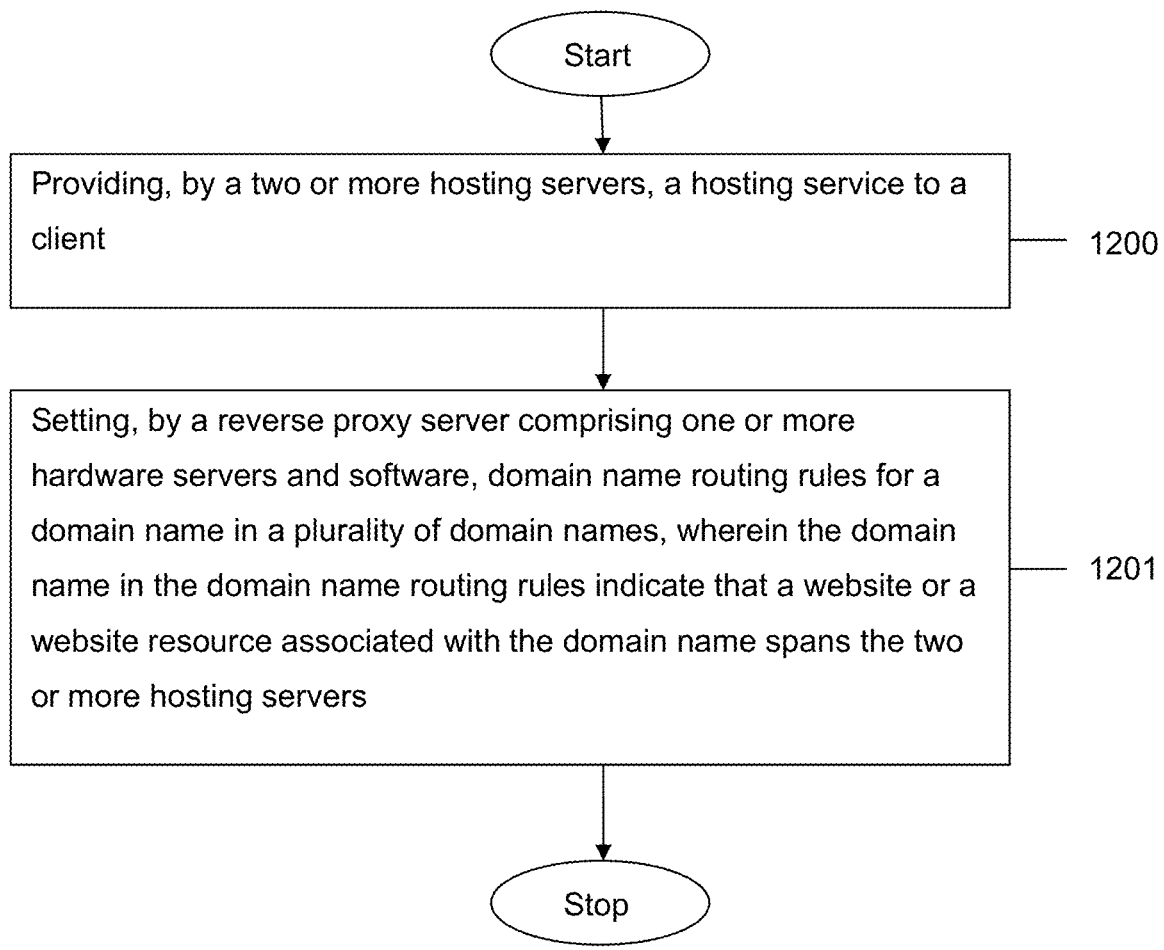
FIG. 12 is a flow diagram of a process for account spanning using domain name routing rules.

FIGS. 3 and 12 illustrate another example method for practicing the invention. Two or more hosting servers 300, 310, 320 may provide a hosting service to a client 100. (Step 1200) A reverse proxy server 110 may set domain name routing rules 140 for a domain name, such as c.com 303, 313, 323, in a plurality of domain names, wherein the domain name c.com 303, 313, 323 in the domain name routing rules 140 indicate that a website or a website resource associated with the domain name c.com 303, 313, 323 spans the two or more hosting servers 300, 310, 320. (Step 1201) In other embodiments, one or more hardware servers may be used to register the domain name c.com to the client 100. In yet other embodiments, the reverse proxy server 110 may receive an incoming request that comprises the domain name c.com (as an example) and fulfill the incoming request on the two or more hosting servers 300, 310, 320 using the domain name routing rules 140 for the domain name c.com in the incoming request.

Figure 13:
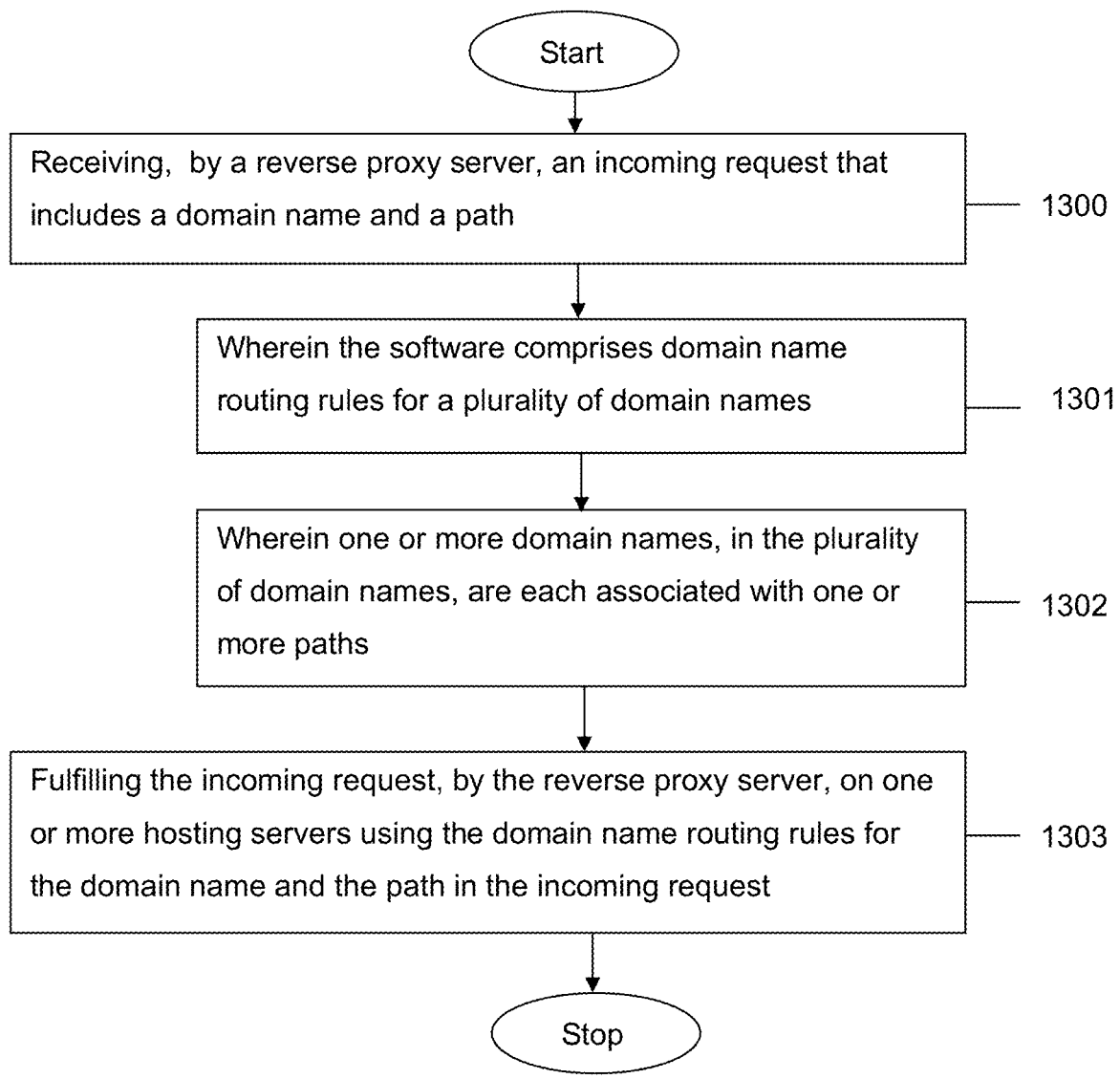
FIG. 13 is a flow diagram of a process for product and service integration using domain name routing rules.

FIGS. 4 and 13 illustrate an example embodiment for an integrated product and/or service for practicing the invention. In this embodiment a reverse proxy server 110 may receive an incoming request (such as an HTTP request) that includes a domain name and a path. (Step 1300) Non-limiting examples of a domain name and a path are a.com/blog 411, where a.com is the domain name and/blog is the path and a.com/cart 421, where a.com is the domain name and/cart is the path. The domain name routing rules 140 may point, locate or identify an address given the domain name and the path in the incoming request. (Step 1301) For example, if a.com/blog were received by the reverse proxy server 110 in an incoming request, the domain name routing rules 140 may point to a.com/blog 411 on the WPaaS hosting server 410. (Step 1302) The reverse proxy server 110 may fulfill the incoming request on one or more hosting servers using the domain name routing rules 140 for the domain name and the path in the incoming request. (Step 1303)

Figure 5:
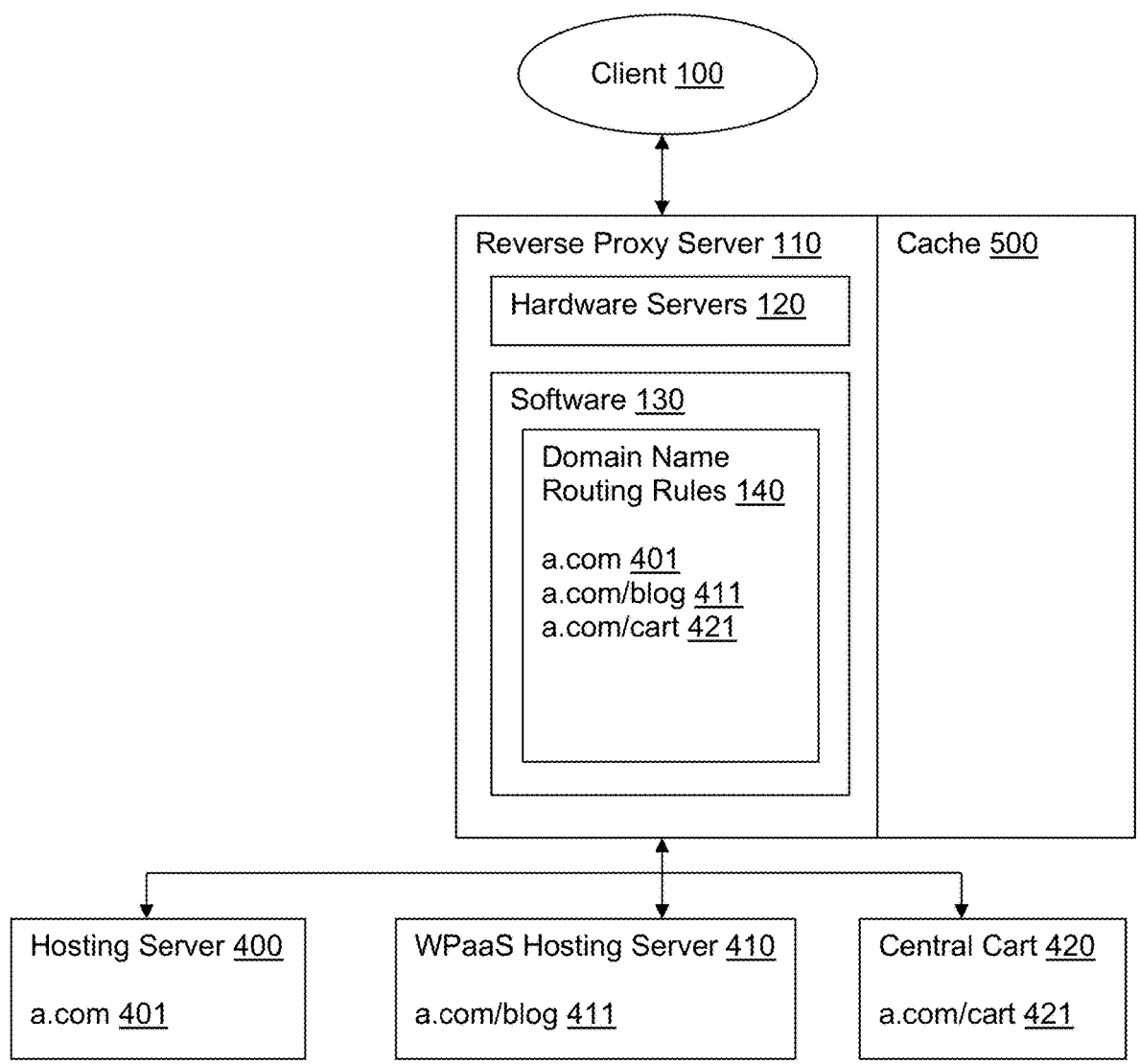
FIG. 5 is a block diagram of a system with caching using domain name routing rules.
Figure 14:
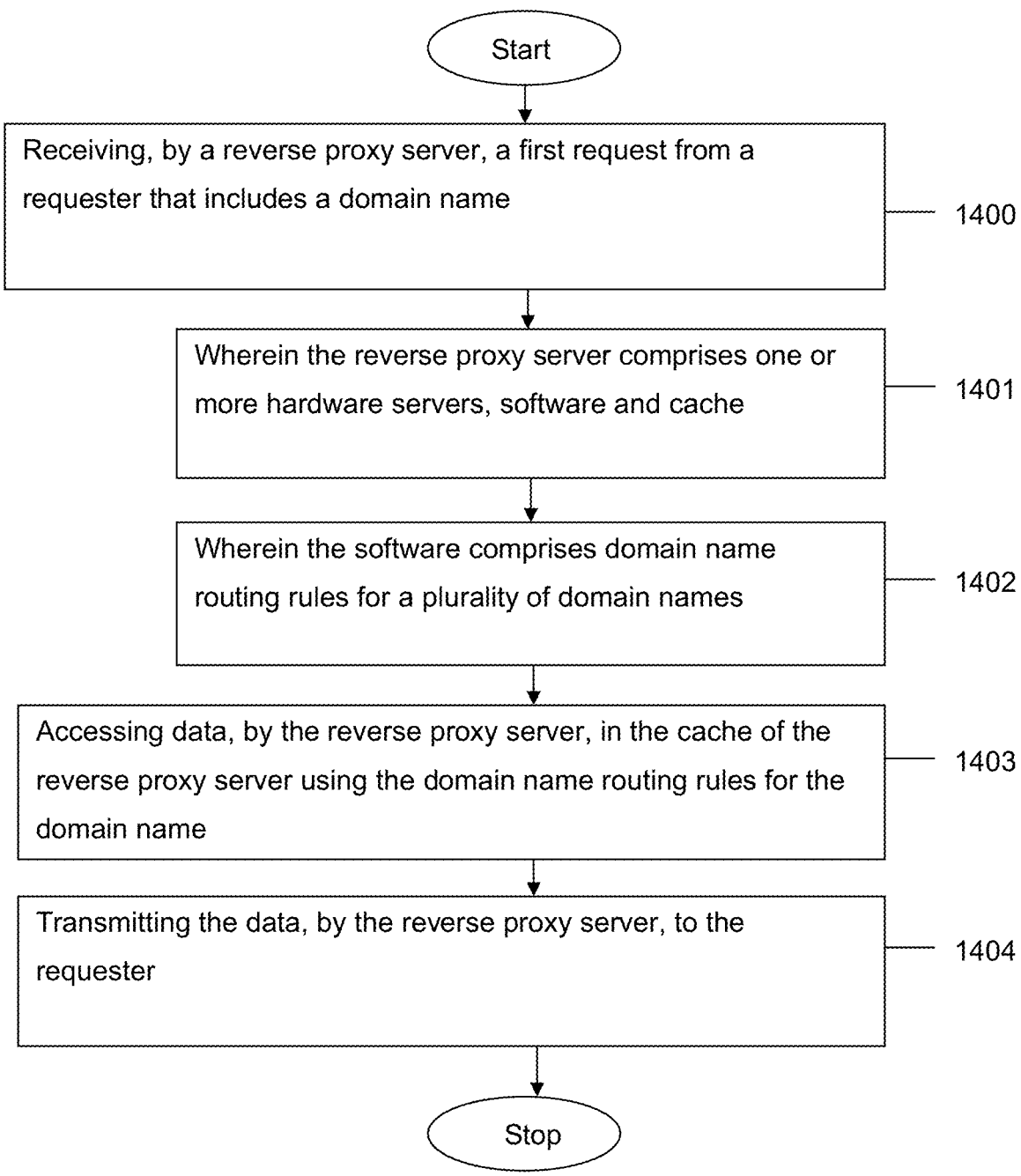
FIG. 14 is a flow diagram of a process for online caching of website resources using domain name routing rules.

FIGS. 5 and 14 illustrate an example embodiment for using cache 500 on the reverse proxy server 110 to practice the invention. The reverse proxy server 110 may receive a first request (possibly an HTTP request) from a requester (who could be client 100) that includes a domain name. (Step 1400) The reverse proxy server 110 may comprise one or more hardware servers 120, software 130 and cache 500. (Step 1401) The software may comprise domain name routing rules 140 for a plurality of domain names. (Step 1402) The reverse proxy server 110 may access data in the cache 500 of the reverse proxy server 110 using the domain name routing rules 140 for the domain name. (Step 1403) The reverse proxy server 110 may transmit the data from cache 500 to the requester. (Step 1404)

Figure 15:
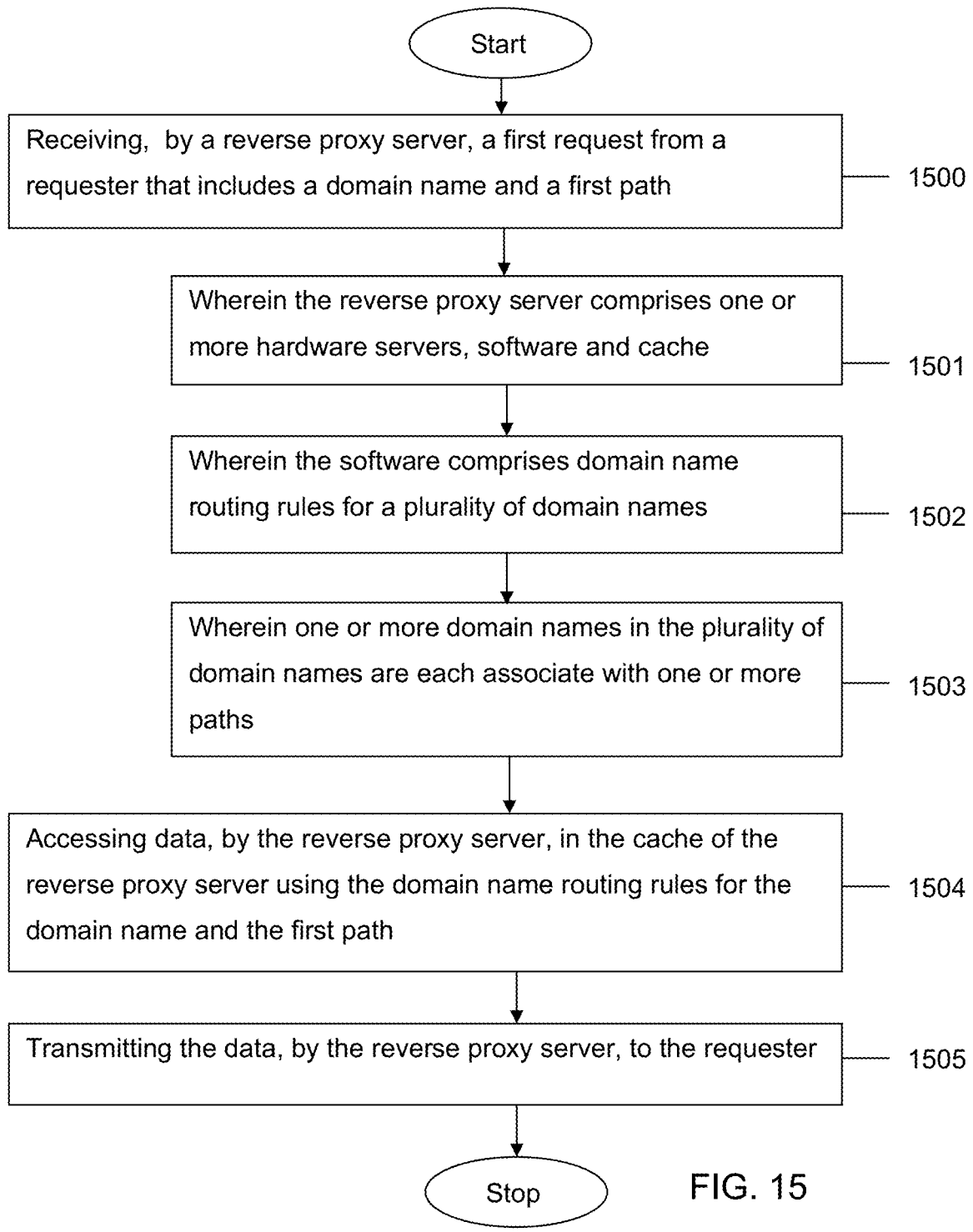
FIG. 15 is a flow diagram of a process for online caching of website resources using domain name routing rules and product and services integration.

FIG. 15 illustrates an example embodiment for using cache 500 on the reverse proxy server 110 to practice the invention. The reverse proxy server 110 may receive a first request (possibly an HTTP request) from a requester that includes a domain name and a path. (Step 1500) The reverse proxy server 110 may comprise one or more hardware servers 120, software 130 and cache 500. (Step 1501) The software may comprise domain name routing rules 140 for a plurality of domain names (Step 1502), wherein one or more of the domain names in the plurality of domain names may have one or more paths. (Step 1503) As an example, FIG. 5 shows that domain name a.com may be associated with path/blog to form a.com/blog 411 and a.com may be associated with path/cart to form a.com/cart 421. The reverse proxy server 110 may access data in the cache 500 of the reverse proxy server 110 using the domain name routing rules 140 for the domain name and the path without accessing a hosting server 400, 410, 420. (Step 1504) The reverse proxy server 110 may transmit the data from the cache 500 to the requester. (Step 1505)

In additional or alternative embodiments, the systems and methods described herein may include components and process steps for modifying the amounts of physical and/or virtual resources on one or more hosting servers that is available to a user for his website(s) or account(s). The modification may be to change the type of hosting framework, or to increase or decrease the allocated resources within the current hosting framework. In some embodiments, the modification may occur automatically when the amount of utilized resources exceeds or drops below a threshold percentage of the total allocated resources. In other embodiments, a warning may be generated and displayed to the user when the threshold percentage is exceeded, with a prompt for the user to request additional resources. In still other embodiments, the user may, via an interface, select the amount of resources desired and the allocated resources may be modified accordingly.

Figure 16:
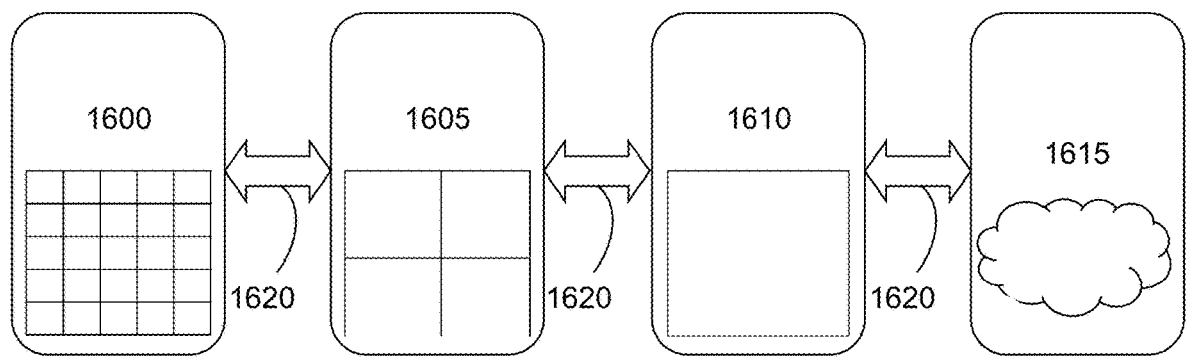
FIG. 16 is a diagram of migration paths between hosting platforms.

Referring to FIG. 16, a hosting provider may offer a product line of hosting platforms, with customers selecting the platform that corresponds to the amount of control and resources the customer needs. A common product line includes, in order by levels of available resources from lowest to highest: a shared hosting platform 1600, a VPS platform 1605, a dedicated platform 1610, and a cloud platform 1615. In known systems, these platforms operate distinctly from each other; there is no path for direct, continuous migration of resources that fills the spaces between the platforms. Furthermore, as the platform services are separate products, there is typically no unified control interface for the user. The effect of this is that, should the user's websites or accounts outgrow the resources provided by the current product, in order to move to the next higher product he may have to wait for a migration between hosting servers to take place and learn a new control interface when he starts using the new product.

Hosting platforms are defined by a user's level of access to the server resources of the hosting server and the available level of customization of the user's own access to the resources. A hosting platform may accommodate multiple users on a single physical hosting server via physical or virtual partitioning of the hardware resources such as storage space, memory, network connection bandwidth, number of accessible CPUs or CPU cores, and number of concurrently running processes. Virtual partitions may be configured to appear to the user as a discrete hosting server, also known as a virtual server or virtual machine (VM), on which the user's website or applications run. Such configuration may be performed by VM managing programs called hypervisors. A hypervisor may be a Type 1, or "native," full-machine virtualization system, in which the hypervisor directly controls the hosting server hardware and provides VMs with their own instances of operating systems and applications to one or more users. Examples of Type 1 hypervisors include MICROSOFT WINDOWS Hyper-V, CITRIX XenServer, Kernel-based Virtual Machine (KVM) for Linux, and OpenStack Ironic, each of which may be configured to control x86 hosting server hardware.

A hypervisor may alternatively (or additionally, such as in the case of KVM) be a Type 2, or "hosted," container-based virtualization system, in which the hypervisor itself runs on the hosting server's native operating system and creates "hosted" VMs having their own instances of the native operating system or another operating system. VMWare Workstation is an example of a Type 2 hypervisor. Additionally, complementary software frameworks may enhance the performance of a hypervisor in a web hosting environment. In one example, the CloudLinux operating system can be configured to operate on a Type 1 or Type 2 hypervisor to create hosting-optimized containers, called Lightweight Virtualization Environment (LVE) containers, that act as virtual machines for the web hosting service user. In the present embodiments, any hypervisor and any complementary technology may be used to partition or otherwise virtualize the hosting server resources as described below.

A shared hosting platform 1600 may include one or more hosting servers having resources that are shared among a plurality of users. Partitions are created and each user is assigned a maximum amount of each pertinent server resource, such as storage space, memory, and bandwidth. The users are given very limited, at best, customization options, as the hosting server may be configured to run only a standard set of web applications, such as an email server, File Transfer Protocol (FTP) server, and HTTP server. A shared hosting platform 1600 may have a uniform density, where all user accounts are granted the same level of access and are thus allocated the same predetermined amount of resources. The density may be quite high, keeping costs to the users low but also decreasing availability of resources. For example, each CPU of a hosting server has a limited number of cores that can execute the users' processes. As density goes up, wait time for a core to perform a requested operation also goes up.

A hosting provider may offer varying levels of density on the hosting servers of its shared hosting platform 1600. For example, some servers may accommodate 1600 users, while other servers of equal resources are partitioned for only 800 users; the users of the latter servers may be allocated twice as many resources as the users of the former. Hosting servers may further have a non-homogenous combination of partitions that have different resource limits, as described further below.

A VPS platform 1605 is similar to a shared hosting platform 1600 in that it may use the same virtualization technologies on its hosting servers to provide virtual partitions within which a VPS for a single user runs. Multiple users on a single hosting server may still share physical resources to some extent. However, a VPS is more customizable, giving the user more configuration and resource management options and allowing installation of virtually any software program that runs on the VPS operating system. Furthermore, a VPS platform 1605 may have far fewer partitions than a shared hosting platform 1600, sharing its resources among fewer users.

A dedicated platform 1610 uses a single partition or no partition on each of its hosting servers, dedicating all of the server resources to a single account. A user may have access to a single hosting server or to multiple hosting servers, each of which may be dedicated to the user's account. The dedicated platform 1610 may continue to use virtualization technologies to create dynamic containers for segmenting processor duties among various software requirements. For example, as described further below, a Linux Container (LXC) may be used to fully or partially lock a processor into affinity with an HTTP server software instance to ensure priority of execution to the software instance's processes.

A cloud platform 1615 may use dedicated hosting servers, VPS or other virtually partitioned hosting server, or a combination thereof to achieve the desired level of access to server resources for the user's account. In one embodiment of cloud platform 1615 hosting, a dynamic VPS may be created for the user's account, with server resource access level and attributes of the VPS configured at runtime. This allows dedication of a particular predetermined amount or real-time calculation of server resources needed for the account. A dynamic VPS is also flexible in that it can be moved between physical server while it is running.

Each platform, including the described platforms 1600-1615, may have a single level of access to resources or multiple levels of access to resources. The present systems and methods provide for a substantially continuous series of migration paths 1620 that allow an account to be moved (i.e., migrated) from one level of access to another. In particular, the migration paths 1620 connect adjacent platforms so that, as a user's account grows in terms of required server resources, it can seamlessly upgrade its access to server resources without experiencing downtime. Similarly, a user whose account is experiencing resource requirements commensurate with a lower level of access can choose to downgrade the account. The migration paths 1620 of the present system are designed so that upgrades and downgrades (i.e., migrations) take place instantly so that no authorized entity loses access to the account being migrated.

Figure 17:
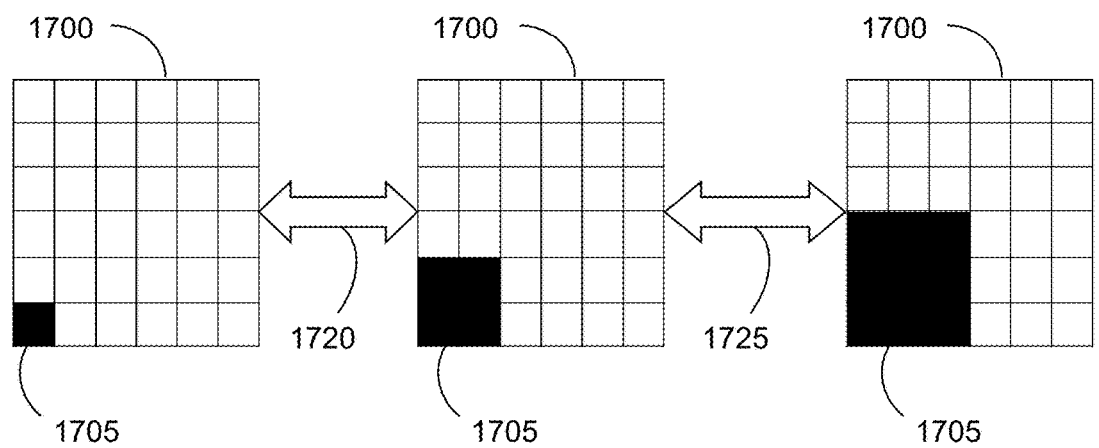
FIG. 17 is a diagram of resizing a virtual partition on a hosting server.

FIG. 17 illustrates a more granular example of migration between levels of access. In one embodiment, the hosting servers of the shared hosting platform 1600 may be configured with uniform density, such that migrating an account between levels of access requires moving the account from its current uniform density shared hosting server to another uniform density shared hosting server having a lower density if the account is being upgraded, or a higher density if the account is being downgraded (assuming all hosting servers of this scenario have the same total amount of server resources). Migrations requiring movement between physical servers are described further below.

In other embodiments, the shared hosting platform 1600 may include one or more variable density hosting servers 1700. A variable density hosting server 1700 may be virtually partitioned such that one, some, or all of the partitions 1705 may be resized in accordance with a migration to a new level of access for the account contained in the partition 1705. In the illustrated example, the partition 1705 is first allocated resources in accordance with the lowest level. A first migration path 1720 upgrades the account by increasing the "size" of the virtual partition 1705—that is, by allocating more server resources to it according to the next highest level of access. Finally, a second migration path 1725 includes again resizing the virtual partition 1705. Each variable density hosting server 1700 may have a maximum partition 1705 size, requiring the account to be moved to the next physical server if another upgrade is desired.

An implementation of a variable density shared hosting server may set the maximum number of users to half of the server's actual capacity. For example, the server's maximum number of users may be set to 800, when the server capacity is 1600 users each having a partition, such as an LVE container, allocated server resources according to the lowest level of access. In this implementation, each user's account may be upgraded one level without having to move the account to another server. Another implementation of the variable density server may protect against bursts of traffic. In this implementation, the container for the user's account may be automatically resized up one level temporarily to accommodate brief periods of increased use.

Where virtual resizing is not available or has been fully utilized, the migration path may include transferring all or part of the account from its current physical hosting server(s) to one or more new hosting servers. Requirements for physical transfer may depend on the source platform and/or level of access, the target platform and/or level of access, and the framework of hosting servers and other servers in the system. Some example implementations are described herein. In one example, where data associated with the account is stored on and hosted from a particular hosting server, a physical transfer may involve copying or moving some or all of the hosted data associated with the account from the current hosting server to the target hosting server.

A hosting administrator as described above may automatically or manually copy or move the files, and may do so before or after a request for increased allocation of resources is received by the hosting administrator. The migration time in this example is determined by the amount of data to be moved and the amount and availability of resources in the source and target hosting servers and the administration and routing servers.

In another example, where migration pertains to a change in hosting server resources and the hosted data is stored on one or more networked or cloud-based data servers (as described further below with respect to FIG. 19), file system access to the hosted data may be mounted or re-mounted at the target hosting server. The migration time may be instantaneous or nearly instantaneous, as the instructions required to perform mounting and re-mounting instructions using known file systems (e.g., NFS, iSCSI) is measured in milliseconds or less. Furthermore, the mounting may occur even before a migration request is made, such that the file system is mounted at both the current and target hosting servers, and the migration path may simply require changing the routing rules to direct traffic to the target server to migrate the account without losing network connectivity. The same mounting steps may be used where the migration pertains to a change in amount of networked data server storage or other parameters of the data server.

Migration between levels of access on a shared hosting platform 1600 may require physical transfer between uniform density shared hosting servers. Migration from a shared hosting platform 1600 to a VPS platform 1605 or dedicated platform 1610, or from a VPS platform 1605 to a dedicated platform 1610, will require physical transfer of the account in most system implementations. In addition, such migration may further require additional configuration of the VPS or dedicated server with parameters such as user administrative access, resource management, and subuser management. Furthermore, a VPS or dedicated server may be an application server, such as a shopping cart or WPaaS server, which may require installation and configuration of software. In some embodiments, the current hosting server may continue serving the account while this additional configuration takes place. In other embodiments, the account may be transferred to the target server and served from the target server in its transferred state, while the additional customizations may be implemented when they are complete. Migration downward between platforms may be accomplished provided the account does not contain more data than can be stored in a partition on the target server.

Present systems may include network data storage, providing better data redundancy and fewer server resources as compared to storing data on the hosting server. Network data storage products such as Nexenta and MySQL may be implemented to manage data. The migration paths may include any suitable steps for retaining the connections to networked databases. In one example, the migration paths include retaining the addresses at which database queries are made. In another example, the migration paths include keeping an instance of a web appliance active in order to retain one or more open connections to the databases during migration. In yet another example, a file system that manages the network access to the account's data may be unmounted remounted on one or more hosting servers as needed to migrate the account.

The systems may further include hardware and/or software for routing requests for data from the account, the requests coming from clients over the internet or another computer network. For example, the account may be a website or may otherwise include website content, and a request for website content may be routed to the hosting server on which the account resides. The system may include one or more reverse proxy servers, such as the reverse proxy server 110 according to any embodiment described herein. The reverse proxy server may thus include domain name routing rules 140 for directing the request to the appropriate hosting server based on the domain name or domain name and path in the request. In such embodiments, migration of the account between hosting server may include updating the domain name routing rules 140 so that the reverse proxy server 110 directs requests to the target hosting server rather than the previous hosting server. In particular, the reverse proxy server may be a high-availability (HA) proxy server such as an Nginx reverse proxy server.

In another embodiment, the system may include a physical or virtual routing server configured to route messages based on layer 7 of the Open Systems Interconnection (OSI) communication model. In this manner, the routing server reads incoming requests for the content in the application layer (layer 7) of an OSI packet in the request. The routing server may route the message according to any of the layer 7 data, such as a URL, host identifier, HTTP header, and the like. In one implementation, some or all of the hosting servers being served by the routing server may be application servers, and the routing server may route requests to the appropriate application server based on the application requested.

Figure 18:
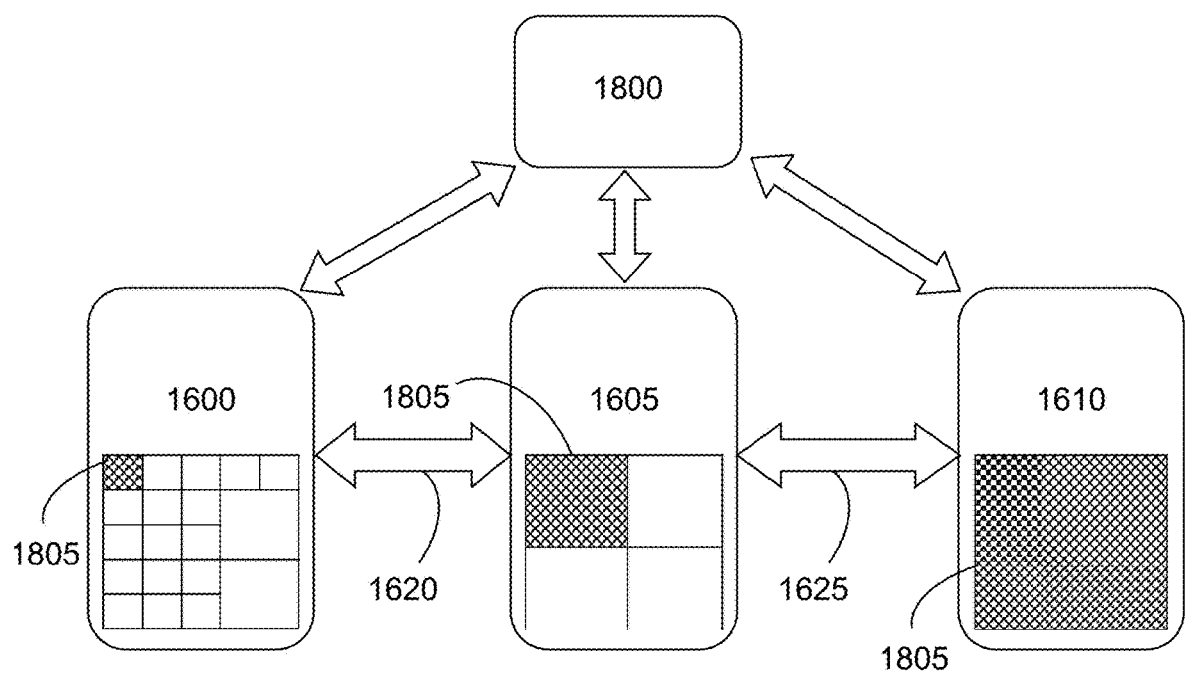
FIGS. 18-21 are diagrams of server frameworks in accordance with the present disclosure.

FIGS. 18-22 illustrate example implementations of server frameworks in a system for allocating server resources according to the present disclosure, whereby migration paths between all levels of resource access provide a continuum of dynamic resource allocation to an account, in which changes in allocation may go unnoticed by the requestors for account data (e.g., website visitors) because hosting services are uninterrupted during migration. As shown in FIG. 18, a traffic routing tier may receive requests for hosted data via a computer network (e.g., the internet). The traffic routing tier may include one or more routing servers 1800, including reverse proxy servers such as Apache Traffic Servers and/or HA proxy servers. Traffic may be routed by the routing servers 1800 to the appropriate hosting server 1600, 1605, 1610 using any of the techniques described above or other appropriate techniques.

Figure 19:
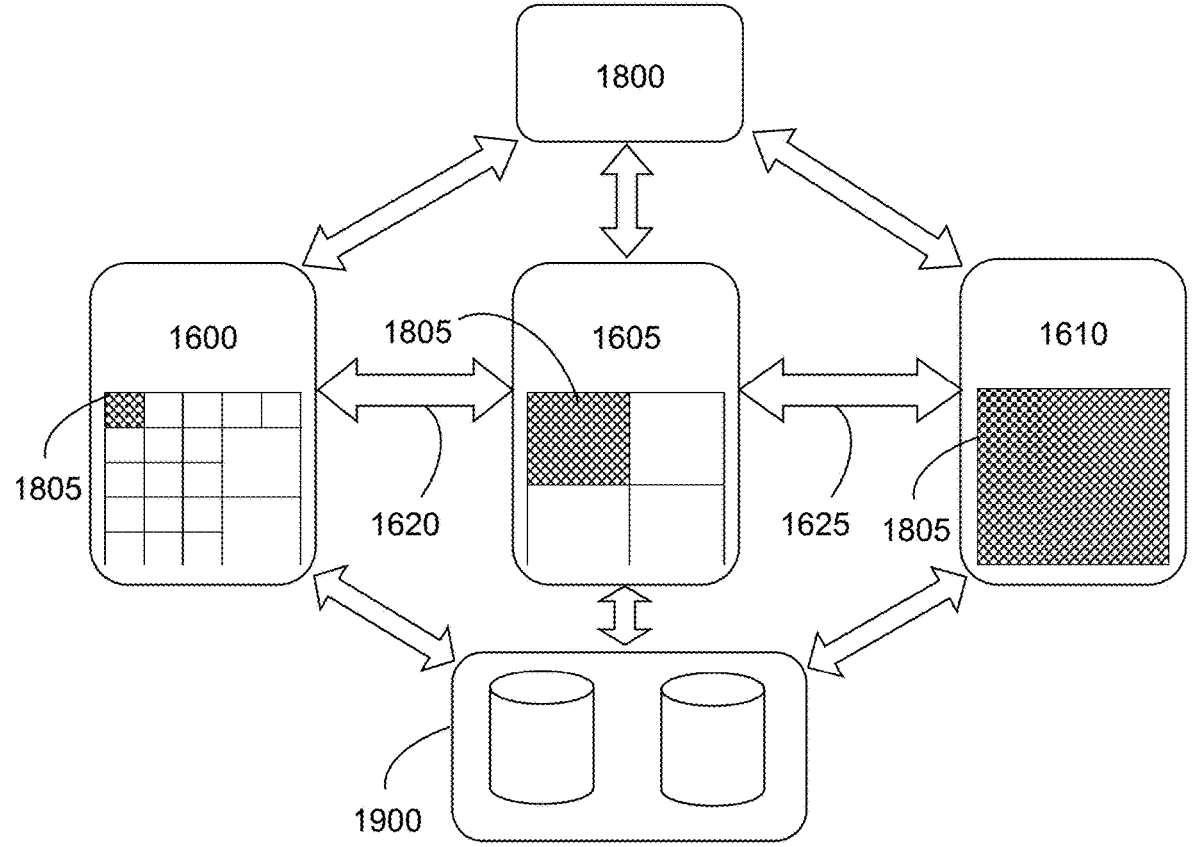

The migration paths 1620, 1625 may include steps for changing the allocation of resources to the account partition 1805, and may further include steps for changing the routing rules at the traffic tier for traffic destined for the account's hosted data. For example, FIG. 18 illustrates the scenario of FIG. 16, where the account may have its partition 1805 moved between hosting servers 1600, 1605, 1610 as needed to obtain the desired amount of hosting resources and control. FIG. 19 adds to FIG. 18 a provision for networked storage via one or more networked data storage servers 1900. Data storage servers 1900 may be any suitable server for storing and serving data, such as a Nexenta file management server, a MySQL data server, or a combination thereof. The migration paths 1620, 1625 may further include steps for managing the linkages of the current and target hosting servers to the account's networked storage on the data storage servers 1900. For example, the migration paths 1620, 1625 may include mounting a data storage server 1900 file system to the account partition 1805 at the target server, and/or unmounting the relevant file system from the current server.

Figure 20:
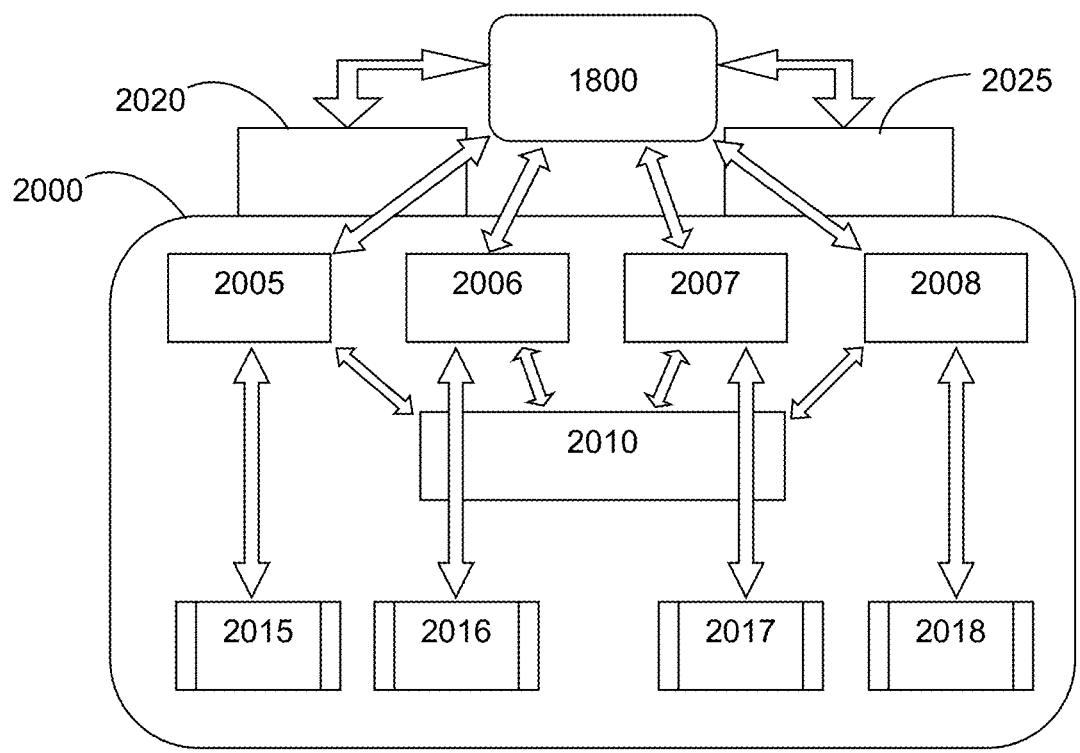
Figure 21:
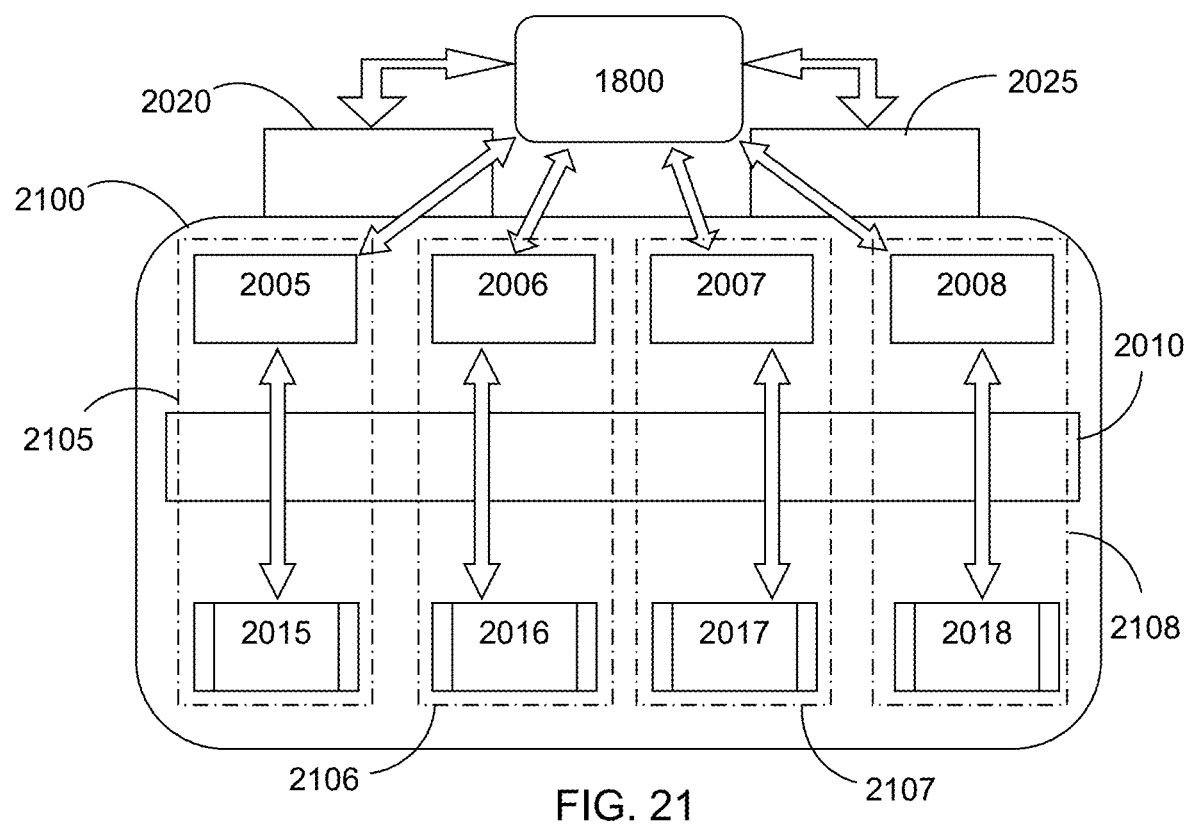

FIGS. 20 and 21 illustrate hosting servers configured for improved performance and/or density by leveraging multiple instances of a software web server on a single physical server. The hosting server 2000, 2100 may be any of the hosting servers described herein. In FIG. 20, a plurality of web server instances 2005-2008, such as Apache WebServer instances, are managed by a control software module 2010 that uses native processes of one or more operating systems on the hosting server 2000 to schedule access for each web server instance 2005-2008 to one or more cores 2015-2018 of the hosting server 2000 CPU. The control software module 2010 maybe any suitable module for the type of hosting server 2000, type of operating system, and number and availability of web server instances 2005-2008 and CPU cores 2015-2018. For example, on a hosting server 2000 using a Linux-based operating system, the control software module 2010 may be a PHP-FastCGI Process Manager (PHP-FPM). Alternatively, in FIG. 21, each of the web server instances 2005-2008 running on the hosting server 2100 may be instantiated in its own virtual container, such as a Linux Container (LXC) 2105-2108, that provides management and scheduling of CPU core 2015-2018 access without interfering with the operation of concurrently running web server instances. A control panel 2020, which may be uniform across all available levels of access to hosting resources as described below, may be provided to further manage the web server instances 2005-2008 and other aspects of hosting data. A central process scheduler 2025 may manage other hosting server 2000, 2100 process and may further share scheduling commands with the control software module 2010.

The system may perform usage analysis of the server resources by the account for the purpose of determining whether the account should be upgraded or downgraded. In some embodiments, the hosting server that hosts the account may indicate that a limit for a particular resource has been met or is within a predetermined threshold of being reached. Such an indication may cause a warning to be generated and displayed to the user, such as through the control panel or the migration interface described below. Furthermore, the usage analysis may include an analysis of usage trends which may indicate expected patterns of increased or decreased usage in the future. In light of the trend analysis, the hosting server or another server may provide a recommendation to the user, via the control panel or migration server, of an upgrade or downgrade to a different level of access.

Another aspect of creating seamless migrations between levels of access is providing consistency in the user's experience interfacing with the system. An administration server, which may be one of the hosting servers or another server, and further may be whichever hosting server hosts the account, may provide to the user a unified control panel for managing the user's account. The control panel may be unified in that it has a consistent appearance and conveys consistent functionality to the user at any level of access. That is, whether the account is on a uniform density shared hosting server, a VPS, or a dedicated server, the control panel does not change except where necessary to add or remove functions as the account is migrated between levels of access. In some embodiments, the system may implement a customizable instance of the user's choice of commercially available hosted control panels, such as cPanel or the Parallels Plesk Panel, across all hosting service levels (i.e. platforms or levels of access).

Figure 22:
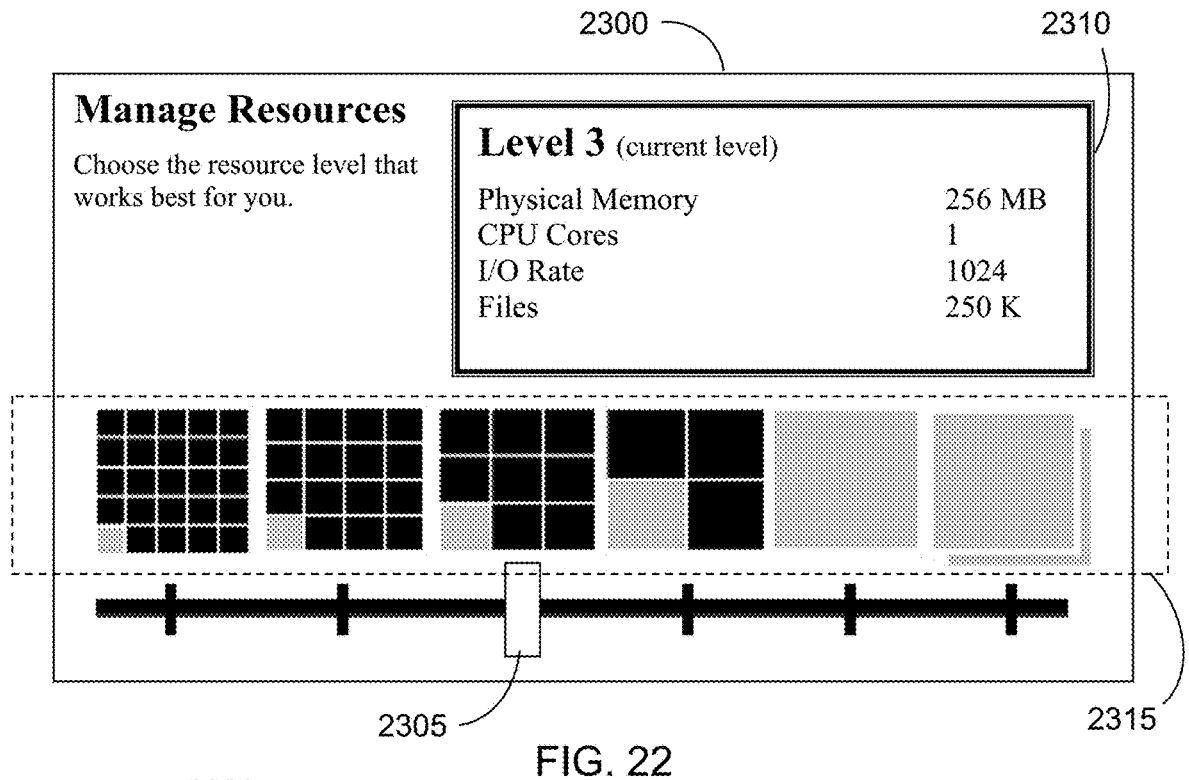
FIGS. 22-24 are diagrams of a migration interface display.

Referring to FIG. 22, the administration server may further provide a migration interface 2300 accessible by the user directly or via the control panel. The migration interface 2300 may provide the user with options to migrate the account between the levels of access. The options may be visually presented. In the embodiment of FIG. 22, the migration interface 2300 includes a slider 2305, which is an interactive graphic that the user clicks and drags to the right or left to raise or lower the level of access. The sliding movement may be continuous or may be tied to predetermined positions that correspond to the selectable levels of access. One or more visual aids may convey to the user the absolute or relative amount of server resources that will be allocated to the account at each position. An example of absolute resource information display is a text list 2310 of the amount of server resources allocated. The text list may be updated every time the slider is moved to a new position. An example of a relative resource information display is illustrated in the form of a graphic visual aid 2315 demonstrating increased allocation as the level of access rises. The slider 2305 may be initially positioned at the current level of access for the account, in which case moving the slider right represents upgrading the account and moving the slider left represents downgrading the account. Any of the positions that correspond to levels of access that are not available for the account may be made unselectable to the user.

Figure 23:
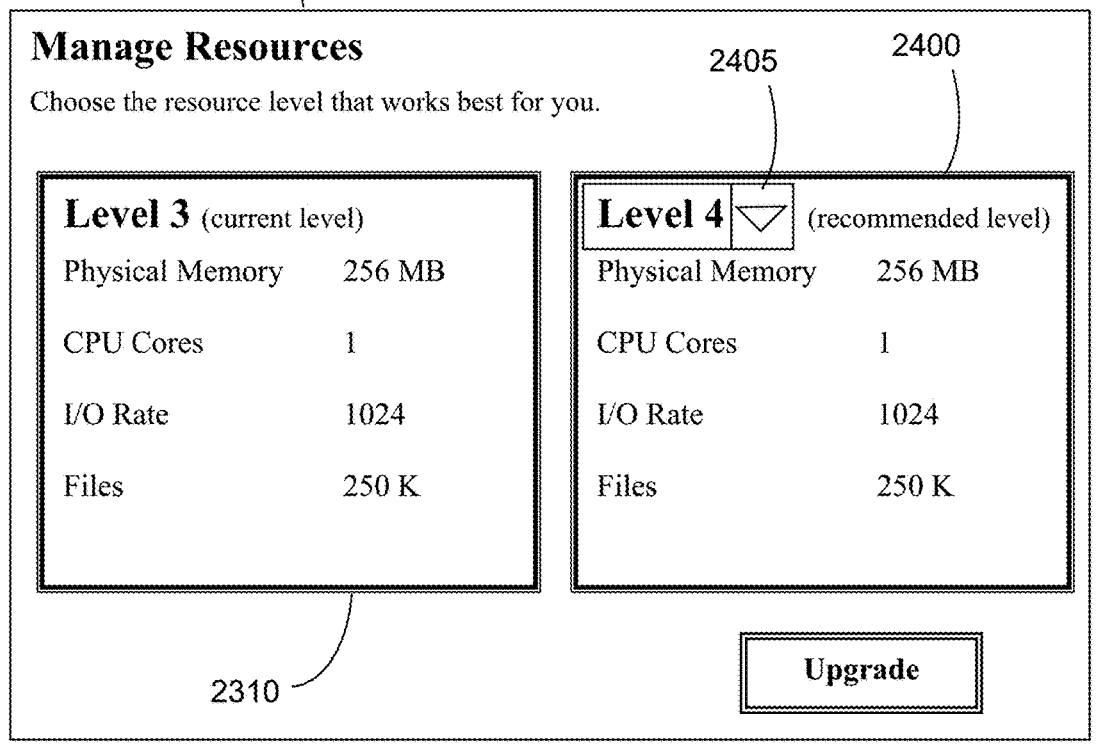
Figure 24:
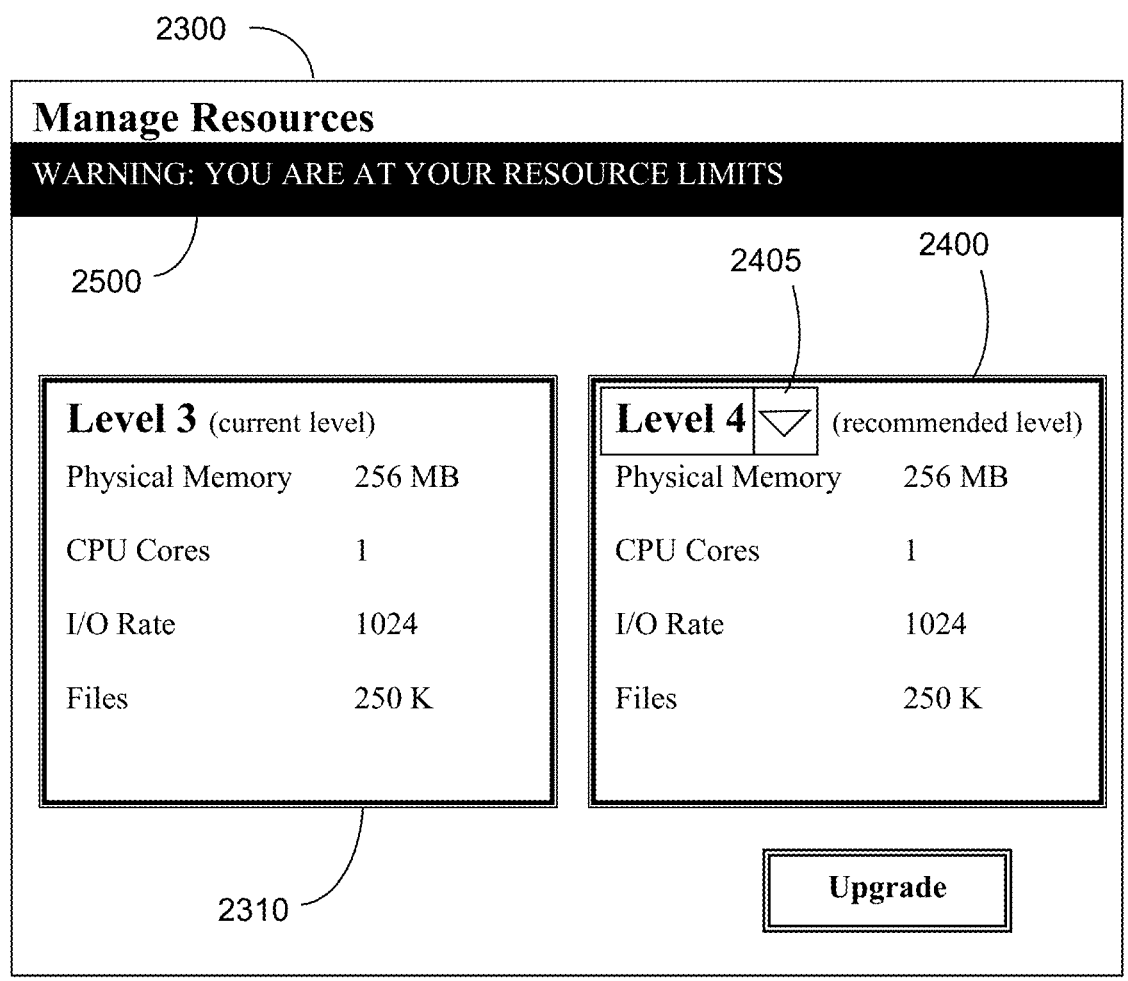

Another embodiment of the migration interface 2300 is shown in FIG. 23. The options may be presented in a text format. The text list 2310 visual aid may display the server resources allocated at the current level. A target level list 2400 may display the server resources to be allocated at any of the available levels, which may be displayed and selected via a drop-down menu 2405 or other interactive menu. The migration interface 2300 may automatically display the recommended level to which the account should be migrated, the recommendation being derived from usage data as described above. Such a text-based migration interface 2300 may also be used to display warnings of usage limitation as described above. FIG. 24 illustrates a migration interface 2300 displaying a warning message 2500 that one or more of the allocated resources is at its limit. Alternatively, the warning message 2500 may be generated and displayed when a threshold that is below the limit is exceeded. In the text list 2310, the parameters that are at or near their limits may be identified, such as by displaying them in a different color than the other text. The warning message 2500 or another warning message may additionally or alternatively be displayed to the user on the control panel.

In addition or alternatively to the migration interface 2300 being made available to the user by one of the servers in the system, the migration interface 2300 may be implemented as an application programming interface (API) that can be accessed by third party servers and other computers. The API may connect to one or more of the hosting servers and may use the migration interface to configure accounts on the hosting servers as described above.

It should be understood that teachings from any embodiment herein described may be combined with teachings from any other embodiment herein described, unless explicitly stated otherwise. As an example, any embodiment described herein using a domain name with domain name routing rules may also use a domain name and a path with the domain name routing rules.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A method comprising:
   displaying, by a hosting provider to a user having an account associated with a partitioned resource, wherein the partitioned resource is associated with a first set of resources, a first migration path to add a first resource to the first set of resources, and a second migration path to remove a second resource from the first set of resources;
   receiving, by the hosting provider from the user, a selected migration path, wherein the selected migration path identifies the first migration path or the second migration path;
   modifying, by the hosting provider, the account of the user according to the selected migration path by copying the account from a first hosting server to a second hosting server;
   wherein the first migration path facilitates instant addition of the first resource to the first set of resources;
   wherein the first migration path comprises a migration path from a dedicated platform to a shared platform or from the shared platform to the dedicated platform; and
   wherein the partitioned resource comprises a virtual partition.

2. The method of claim 1, wherein when the selected migration path identifies the first migration path, modifying the account of the user includes modifying the account of the user to include the first resource.

3. The method of claim 1, wherein the first resource includes storage space, physical memory, or network bandwidth.

4. The method of claim 1, wherein the first resource includes a number of accessible CPUs.

5. A method, comprising:
   determining, by a hosting provider hosting an account associated with a partitioned resource, a first set of resources, and a user, a first migration path to add a first resource to the first set of resources;
   receiving, by the hosting provider from the user, a selected migration path, wherein the selected migration path identifies the first migration path;
   modifying, by the hosting provider, the account of the user according to the selected migration path by copying the account from a first hosting server to a second hosting server;
   wherein the first migration path facilitates instant addition of the first resource to the first set of resources;
   wherein the first migration path comprises a migration path from a dedicated platform to a shared platform or from the shared platform to the dedicated platform; and
   wherein the partitioned resource comprises a virtual partition.

6. The method of claim 5, wherein the first resource includes storage space, physical memory, or network bandwidth.

7. The method of claim 5, wherein the first resource includes a number of accessible CPUs.

8. A system, comprising:
a hosting provider hosting an account associated with a partitioned resource, a first set of resources, and a user, wherein the hosting provider includes a processor configured to execute instructions for:
determining a first migration path to add a first resource to the first set of resources;
receiving a selected migration path, wherein the selected migration path identifies the first migration path;
modifying the account of the user according to the selected migration path by copying the account from a first hosting server to a second hosting server;
wherein the first migration path facilitates instant addition of the first resource to the first set of resources;
wherein the first migration path comprises a migration path from a dedicated platform to a shared platform or from the shared platform to the dedicated platform; and
wherein the partitioned resource comprises a virtual partition.

9. The system of claim 8, wherein the first resource includes storage space, physical memory, network bandwidth, or a number of accessible CPUs.

\* \* \* \* \*